(12) United States Patent
Hoshika

(10) Patent No.: US 9,813,639 B2
(45) Date of Patent: Nov. 7, 2017

(54) IMAGE PROCESSING DEVICE AND CONTROL METHOD FOR THE SAME FOR APPLYING A PREDETERMINED EFFECT TO A MOVING IMAGE

(71) Applicant: CANON KABUSHIKI KAISHA, Tokyo (JP)

(72) Inventor: Hiroyuki Hoshika, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/966,468

(22) Filed: Dec. 11, 2015

(65) Prior Publication Data

US 2016/0191816 A1    Jun. 30, 2016

(30) Foreign Application Priority Data

Dec. 25, 2014  (JP) .................................. 2014-263038

(51) Int. Cl.
*H04N 5/77* (2006.01)
*H04N 5/262* (2006.01)
*H04N 9/804* (2006.01)
*H04N 9/806* (2006.01)

(52) U.S. Cl.
CPC ......... *H04N 5/2621* (2013.01); *H04N 5/2628* (2013.01); *H04N 5/772* (2013.01); *H04N 9/806* (2013.01); *H04N 9/8042* (2013.01)

(58) Field of Classification Search
CPC .... H04N 5/2621; H04N 5/2628; H04N 5/772; H04N 9/8042; H04N 9/806

USPC ........................................................ 386/223
See application file for complete search history.

(56) References Cited

U.S. PATENT DOCUMENTS

| | | | | |
|---|---|---|---|---|
| 5,999,698 A | * | 12/1999 | Nakai | G11B 19/02 |
| | | | | 348/E5.103 |
| 7,903,903 B1 | * | 3/2011 | Acker | H04N 5/222 |
| | | | | 348/578 |
| 2002/0122656 A1 | * | 9/2002 | Gates | G11B 27/034 |
| | | | | 386/214 |
| 2005/0191041 A1 | * | 9/2005 | Braun | G11B 27/034 |
| | | | | 386/243 |
| 2010/0134633 A1 | * | 6/2010 | Engeli | H04N 7/0122 |
| | | | | 348/180 |
| 2016/0191816 A1 | * | 6/2016 | Hoshika | H04N 5/2621 |
| | | | | 386/280 |

FOREIGN PATENT DOCUMENTS

JP          2012023472 A          2/2012

* cited by examiner

*Primary Examiner* — David Harvey
(74) *Attorney, Agent, or Firm* — Canon USA, Inc., IP Division

(57) ABSTRACT

It is determined whether an angle of view is changed or an image with an aspect ratio different from the aspect ratio of the moving image is inserted in a moving image recorded in a temporally continuous manner (system control unit), and when it is determined that an angle of view or an aspect ratio is changed, a predetermined effect is applied to the moving image (image processing unit).

19 Claims, 12 Drawing Sheets

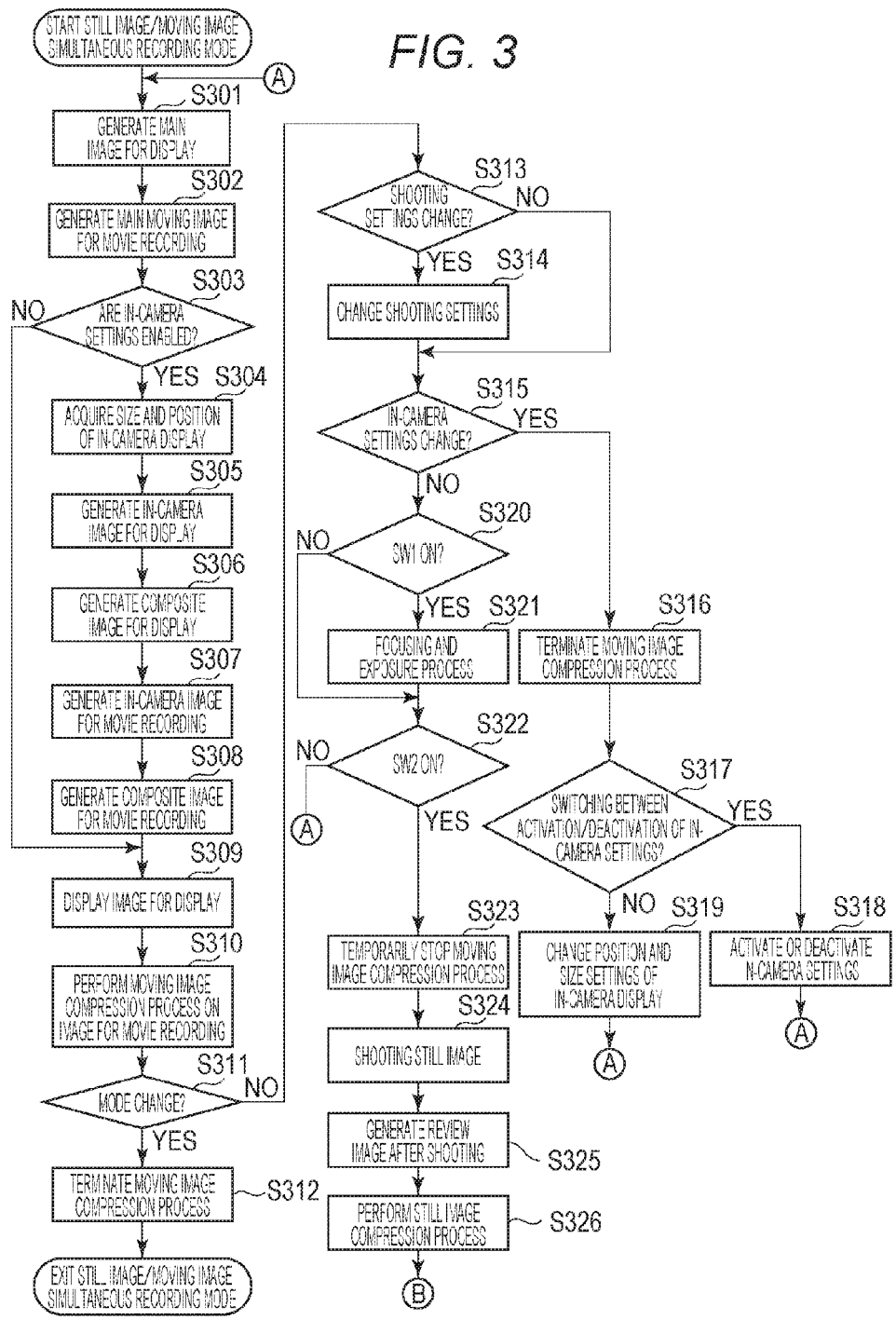

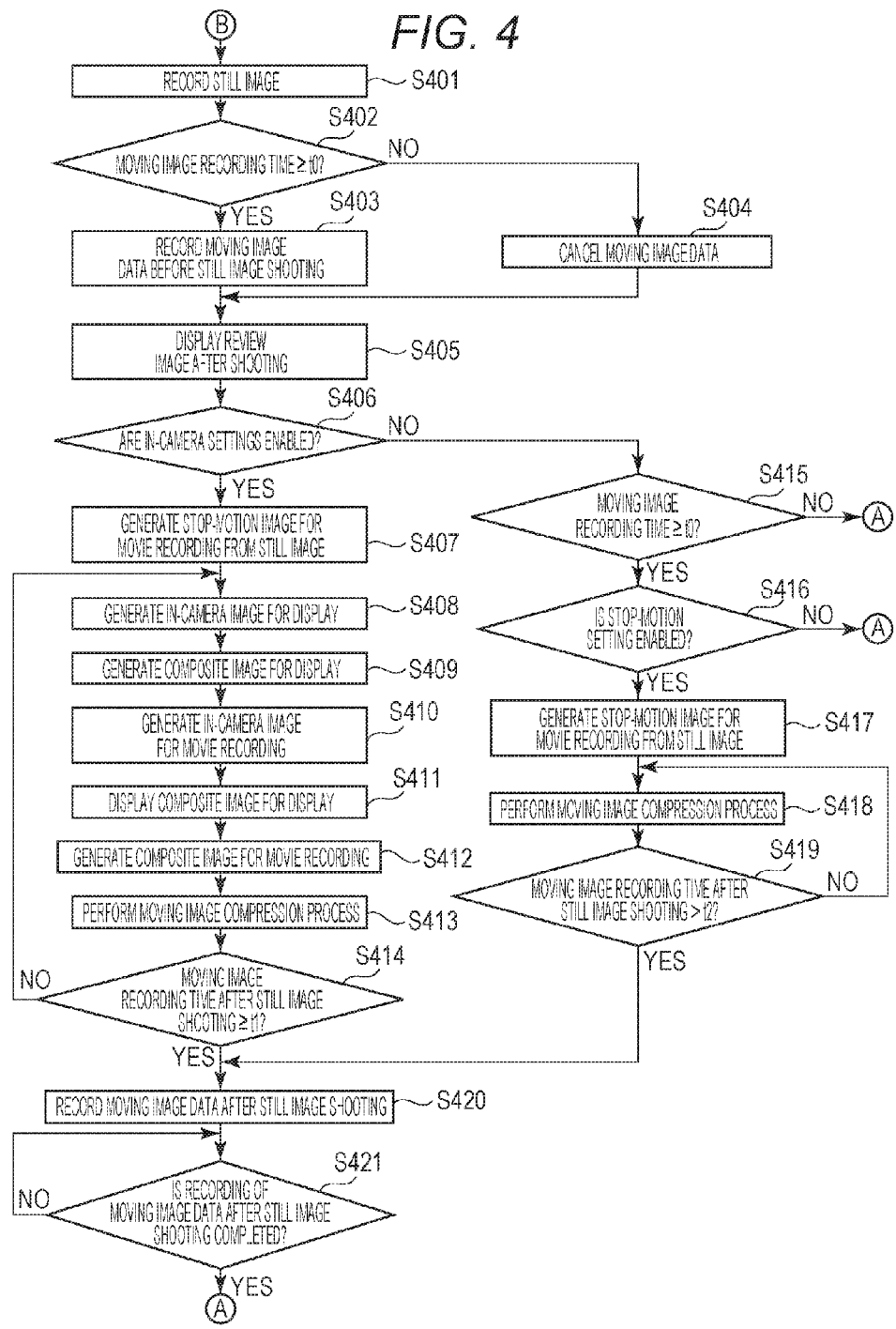

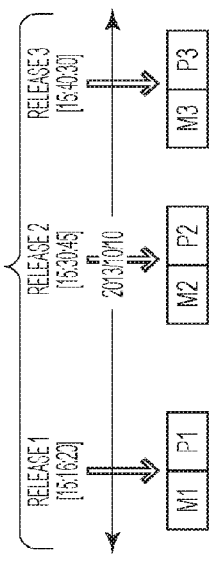
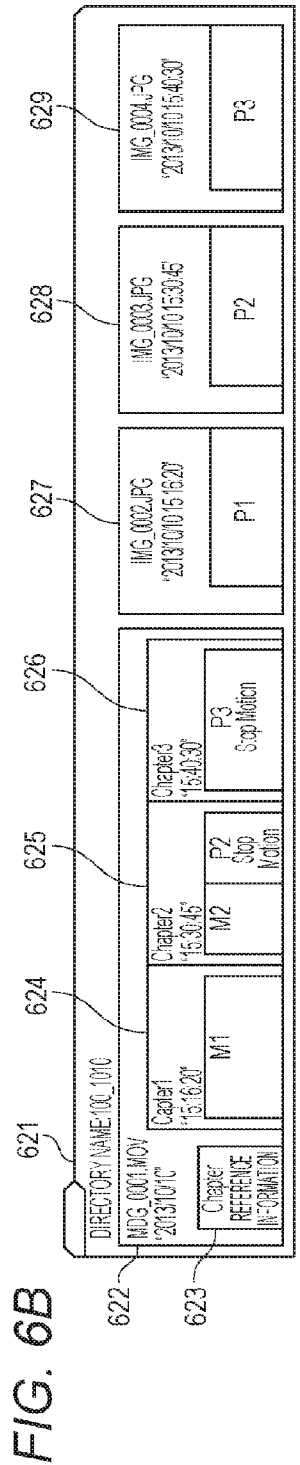
FIG. 6A
FIG. 6B
FIG. 6C

FIG. 8A

| TOTAL NUMBER OF FRAMES | 1600 | | | | | |
|---|---|---|---|---|---|---|
| SCENE NUMBER | FILE PATH | CHAPTER | NUMBER OF FRAMES TO BE DISPLAYED | PLAYBACK EFFECT INFORMATION | SUB EFFECT INFORMATION | BACKGROUND COLOR | CHARACTER STRING |
| 1 | DCIM/100_1010/MDG_0001.MP4 | 1 | 180 | NO EFFECT | - | NONE | SHOOTING DATE |
| 2 | DCIM/100_1010/IMG_0002.JPG | - | 120 | ZOOM-OUT | 80%-100% | NONE | NONE |
| 3 | DCIM/100_1010/MDG_0001.MP4 | 2 | 120 | NO EFFECT | - | NONE | NONE |
| 4 | DCIM/100_1010/MDG_0001.MP4 | 5 | 120 | STOP-MOTION CROSS-FADE | 60 | NONE | NONE |
| ⋮ | | | | | | | |
| 50 | DCIM/100_1010/MDG_0001.MP4 | 49 | 60 | PHOTOGRAPHER | 640,540,160,80 | GRAY | photographer |

Column labels: 801 SCENE NUMBER, 802 FILE PATH, 803 CHAPTER, 804 NUMBER OF FRAMES TO BE DISPLAYED, 805 PLAYBACK EFFECT INFORMATION, 806 SUB EFFECT INFORMATION, 807 BACKGROUND COLOR, 808 CHARACTER STRING

IMAGE PROCESSING DEVICE AND CONTROL METHOD FOR THE SAME FOR APPLYING A PREDETERMINED EFFECT TO A MOVING IMAGE

BACKGROUND OF THE INVENTION

Field of the Invention

The present invention relates to an image processing device, more specifically to playback effects.

Description of the Related Art

Digital still cameras and mobile terminals have conventionally provided slide shows with application of transition effects to shot a moving image and a still image.

In recent years, the contents of transition effects have been automatically decided.

Japanese Patent Application Laid-Open No. 2012-23472 describes a method for deciding transition effects depending on shooting modes.

SUMMARY OF THE INVENTION

The present invention provides an image processing device including: a determination unit configured to determine whether an angle of view or an aspect ratio is changed in a moving image recorded in a temporally continuous manner; and an image processing unit configured to, when the angle of view or the aspect ratio is changed, apply a predetermined effect to the moving image.

Further features of the present invention will become apparent from the following description of exemplary embodiments (with reference to the attached drawings).

BRIEF DESCRIPTION OF THE DRAWINGS

FIG. 3 is a flowchart describing overall operations in a still image/moving image simultaneous shooting mode in the present invention.

FIG. 4 is a flowchart describing operations after shooting in the still image/moving image simultaneous shooting mode in the present invention.

FIGS. 6A to 6C include diagrams illustrating a configuration of images shot in the still image/moving image simultaneous shooting mode and moving image chapter reference information in the present invention.

FIGS. 8A and 8B include diagrams illustrating examples of a scenario created and image display at the time of album playback.

DESCRIPTION OF THE EMBODIMENTS

Figure 1:
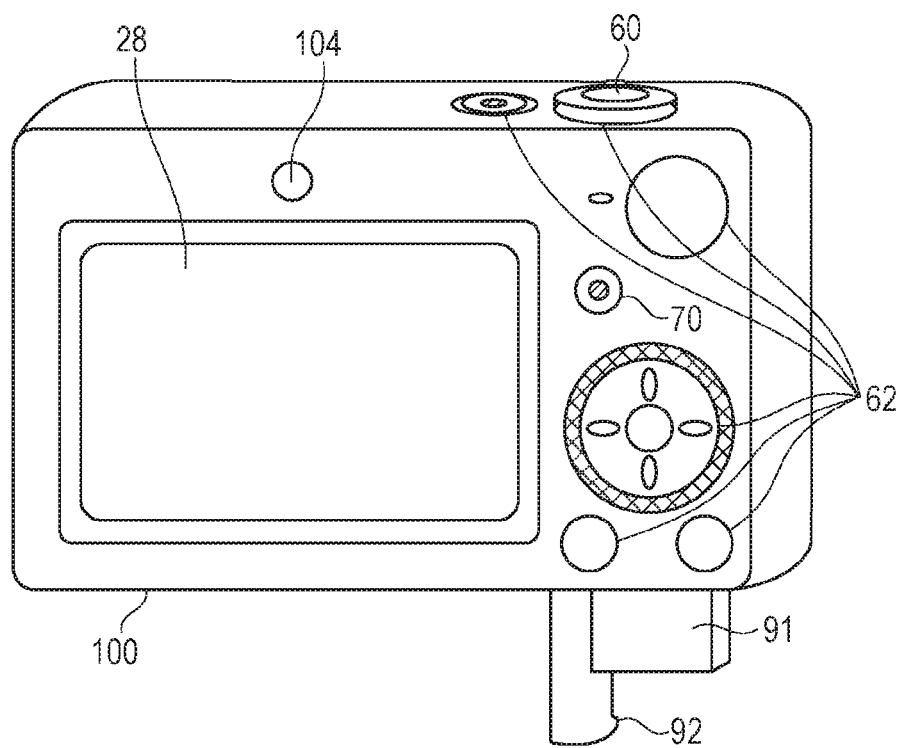
FIG. 1 is an external view of an image processing device in the present invention.

Embodiments of the present invention will be described below with reference to the accompanying drawings.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

(First Embodiment)

In relation to this embodiment, a digital camera 100 as an example of an imaging device according to the present invention will be described.

<External Appearance of the Digital Camera 100>

FIG. 1 is a rear view of the digital camera 100 as an example of the imaging device according to the present invention.

A display unit 28 is a display unit that displays images and various types of information. A shutter button 60 is an operating member for giving an instruction for still image shooting. A moving image shooting button 70 is an operating member for giving an instruction for moving image shooting. An operation unit 62 is an operation unit composed of operating members such as various switches and buttons for accepting various operations from the user, and accepts operations from the user. The operation unit 62 includes a power switch that switches between power-on and power-off of the digital camera 100, a mode selection switch that switches between operation modes of the digital camera 100, a menu button for setting menu items, cross key buttons for specifying menu items and settings, and the like. A recording medium 91 is a recording medium such as a memory card or a hard disc. A cover 93 is a cover for storing the recording medium 91.

Reference sign 104 indicates a camera module that is composed of a lens and an imaging element for image shooting to shoot the shooter shooting a subject or shoot the viewer viewing images displayed on the display unit 28. Hereinafter, the camera will be referred to as in-camera.

The in-camera 104 is arranged on the side of the digital camera 100 where the display unit 28 is provided to shoot the viewer or the shooter. FIG. 1 illustrates an external appearance of the rear side of the digital camera with the display unit 28. The digital camera 100 has on the front side an out-camera as an imaging unit to shoot a subject. Optical axes (shooting directions) of the out-camera and the sub-camera are almost parallel to each other, and the optical axis (shooting direction) of the out-camera is set in the direction opposite to the optical axis of the sub-camera (shooting direction).

<Configuration of the Digital Camera 100>

Figure 2:
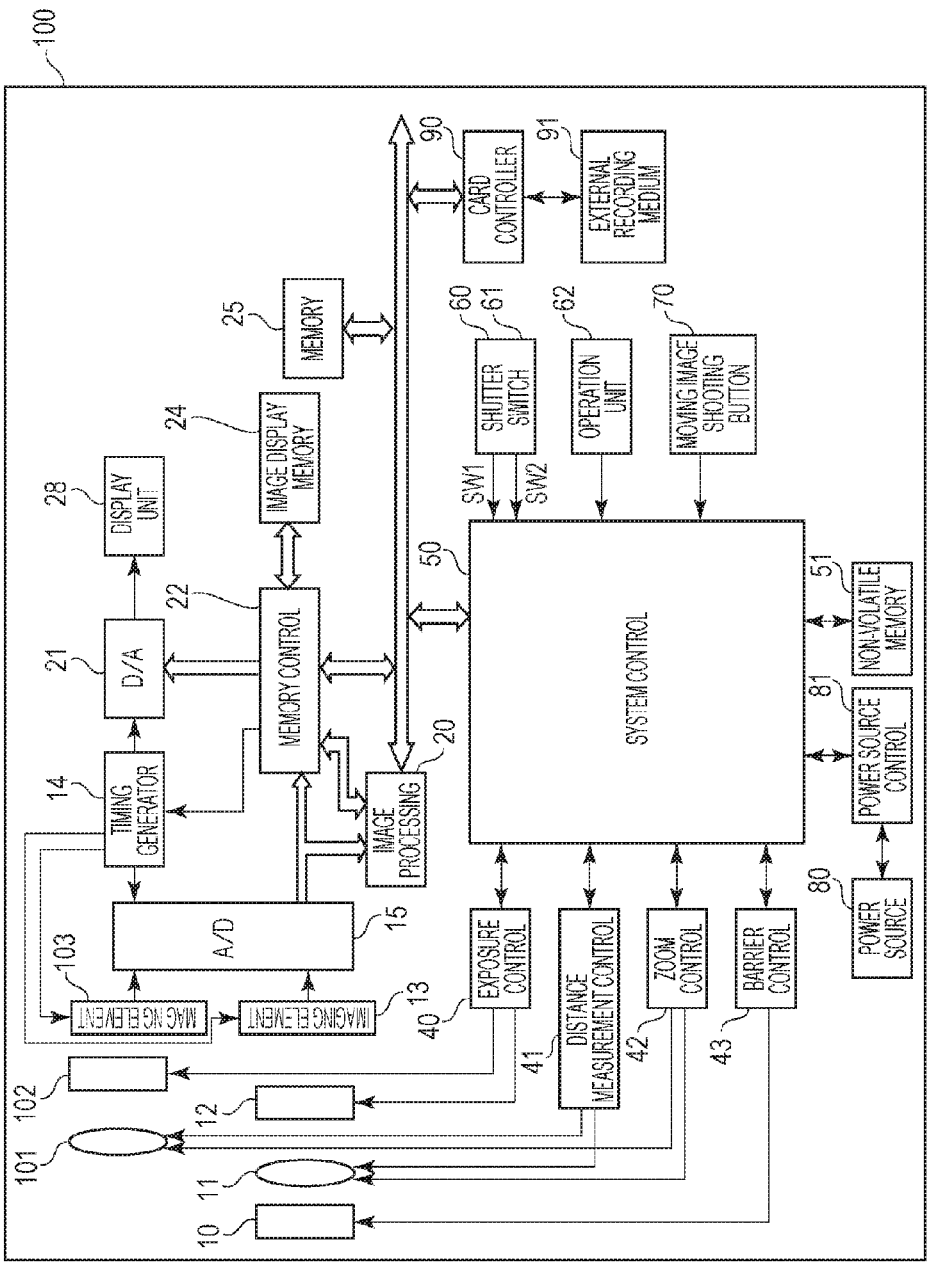
FIG. 2 is a diagram illustrating a configuration of the image processing device in the present invention.

FIG. 2 is a block diagram illustrating a configuration of the digital camera 100 as an example of the present invention.

Reference sign 10 denotes a protection means as a barrier to cover the imaging unit of the digital camera 100 including a shooting lens 11 to prevent soiling and breakage of the imaging unit. Reference sign 11 denotes the shooting lens, 12 a shutter with a diaphragm function, 13 an imaging element composed of CCD and CMOS elements that convert an optical image into an electric signal, and 15 an A/D converter that converts an analog signal output from the imaging element 13 into a digital signal to acquire image data. The barrier 10, the shooting lens 11, the shutter 12, and the imaging element 13 constitute the out-camera.

Similarly, a shooting lens 101 is a lens group including a zoom lens and a focus lens that are arranged in a direction in which the shooter using the digital camera 100 can be shot, separately from the shooting lens 11. Reference sign 102 denotes a shutter with a diaphragm function. Reference sign 103 indicates an imaging element composed of CCD and CMOS elements to convert the optical image of the user side into an electric signal. The shooting lens 101, the shutter 102, and the imaging element 103 constitute the in-camera.

Reference sign 14 denotes a timing generation circuit that supplies clock signals and control signals to the imaging elements 13 and 103, the A/D converter 15, and a D/A converter 21, and is controlled by a memory control circuit 22 and a system control unit 50.

In the in-camera, an in-camera shooting function can be activated or deactivated. When the in-camera shooting function is activated, an image generated based on data read from the imaging element 103, that is, an image shot by the in-camera is recorded in an external recording medium 91. When the in-camera shooting function is deactivated, the imaging element 103 is not driven, that is, no shooting is performed by the in-camera. Otherwise, the imaging element 103 is driven to shoot but the data is not read from the imaging element 103 such that the image based on the output of the imaging element 103 is not recorded in the external recording medium 91.

Reference sign 20 denotes an image processing circuit (image processing unit) that performs a predetermined pixel interpolation process or color conversion process on the data from the A/D converter 15 or the data from the memory control circuit 22.

The image processing unit 20 also performs a predetermined calculation process using the captured image data. Then, the system control unit 50 controls an exposure control unit 40 and a distance measurement control unit 41 based on the acquired calculation results to perform an AF (autofocus) process, an AE (auto-exposure) process, and an EF (flash preliminary emission) process.

The image processing unit 20 also performs a predetermined calculation process using the shot image data and performs an AWB (auto-white balance) process based on the acquired calculation results.

Further, the image processing unit 20 reads an image from a memory 25, performs a compression processing or a decompression process on the read an image in JPEG format or MPEG-4 AVC/H. 264 format, and writes the processed data into the memory 25. The image processing unit 20 also composites an image shot by the out-camera with an image shot by the in-camera. To form a composite image to be recorded, the in-camera image is superimposed on the out-camera image. To form a composite image to be displayed, the in-camera image is superimposed on the out-camera image, and then an icon, a bit map for information display, and font data are further superimposed on the composite image.

Reference sign 22 denotes the memory control circuit (memory control unit) that controls the A/D converter 15, the timing generation circuit 14, the image processing unit 20, an image display memory 24, the D/A converter 21, and the memory 25.

The data in the A/D converter 15 is written into the image display memory 24 or the memory 25 via the image processing unit 20 and the memory control circuit 22 or directly via the memory control circuit 22.

Reference sign 24 denotes the image display memory and 21 the D/A converter. Reference sign 28 denotes the display unit composed of a TFT, an LCD, and the like to display an image based on the display image data written into the image display memory 24 via the D/A converter 21. Displaying sequentially the captured image data on the display unit 28 could perform an electronic viewfinder function to display a live video image. The display unit 28 is used to display the shot image as described above and also display graphic user interfaces for changing the menu and settings. The display unit 28 also includes a terminal for outputting video signals to an external display device such as a TV. The system control unit 50 may perform not only the display control on the display unit 28 but also display control to display the shot image and the graphic user interfaces on the external display device.

Reference sign 25 denotes the memory that stores the shot still images and moving images and includes a capacity sufficient to store a predetermined number of still images and a predetermined time for a moving image. The memory 25 can also be used as a work area for the system control unit 50.

Reference sign 40 denotes the exposure control circuit (unit) that controls individually the shutters 12 and 102 with a diaphragm function.

Reference sign 41 denotes the distance measurement control circuit (unit) that controls individually focusing of the shooting lenses 11 and 101, 42 a zoom control circuit (unit) that controls individually zooming of the shooting lenses 11 and 101, and 43 a barrier control circuit (unit) that controls operations of the barrier 10.

Reference sign 50 denotes a system control circuit (system control unit) that controls the entire digital camera.

Reference sign 51 denotes non-volatile memory that allows electrical data erasing and recording, and may be EEPROM or the like, for example. The non-volatile memory 51 records programs and various types of setting information.

Reference sign 60 denotes the shutter button. When, during operation of the shutter button 60 (half-press state), a shutter switch SW1 is turned on to input an SW1 signal to the system control unit 50. When the SW1 signal is input, the system control unit 50 issues an instruction for starting a shooting preparatory operation such as the AF (auto-focus) process, the AE (auto-exposure) process, the AWB (auto-white balance) process, or the EF (flash preliminary emission) process. Upon completion of operation (full-press) of the shutter button 60, a shutter switch SW2 is turned on to input an SW2 signal to the system control unit 50. When the SW2 signal is input, the system control unit 50 issues an instruction for starting shooting and recording of a still image by the out-camera. When the start of shooting and recording a still image is instructed, an exposure process is first performed to write the signal read from the imaging element 13 into the memory 25 via the A/D converter 15 and the memory control circuit 22. Then, a development process is performed on the image data written into the memory 25 through calculations by the image processing unit 20 and the memory control circuit 22. The developed image data is compressed by the image processing unit 20 and stored in the memory 25. After that, the compressed image data is read from the memory 25 and written into the external recording medium 91 via a card controller 90. In this manner described above, the series of operations of shooting and recording still image data is performed according to the inputting of the SW2 signal.

Reference sign 62 denotes the operation unit composed of various buttons and a touch panel for inputting various operational instructions to the system control unit 50. The various buttons include a power button, a menu button, a mode selection switch for switching among a shooting mode, a playback mode, and another special image-taking mode, a cross key, a set button, and the like. The buttons also include a macro button, a multi-screen reproduction page-break button, a flash setting button, a single shooting/continuous shooting/self-timer shooting switch button. The buttons further include a menu shift+ (plus) button, a menu shift− (minus) button, a playback image shift+ (plus) button, a playback image shift− (minus) button, a shooting image quality select button, an exposure correction button, a date/time setting button, and the like. The foregoing buttons and touch panel are configured in a single combination or plural combinations.

Reference sign 70 denotes the moving image shooting button. When the moving image shooting button is operated (pressed), the system control unit instructs the out-camera to start moving image shooting. When the start of moving image shooting is instructed, a signal is read from the imaging element 13 and converted by the A/D converter 15 to acquire image data. The image processing unit 20 performs a moving image compression processing on the acquired image data and stores the compressed image data in the external recording medium 91. The moving image compression process and recording process are carried out in cycles to record the moving image in the external recording medium 91. The moving image compression process and recording process are executed until the moving image shooting button 70 is pressed again. When the moving image shooting button 70 is pressed again, the moving compression processing is terminated and the moving image recorded so far are recorded in one moving image file in the external recording medium 91.

Reference sign 81 denotes a power control circuit (unit).

Reference sign 80 is a power supply composed of a primary battery such as an alkali battery or a lithium battery, a secondary battery such as a NiCd battery, a NiMH battery, or a Li battery, or an AC adapter.

Reference sign 90 denotes the card controller that performs control to exchange data with an external recording medium such as a memory card. Reference sign 91 denotes the external recording medium such as a memory card.

The components such as the image processing unit 20, the memory control unit 22, the exposure control unit 40, the distance measurement control unit 41, the zoom control unit 42, the barrier control unit 43, the power supply 80, and the card controller 90 are dedicated circuits or general-use programmed processors for performing their respective processes. Alternatively, without using the separate circuits or processors, some or all of the processes may be implemented by one dedicated circuit or processor.

<Still Image/Moving Image Simultaneous Shooting and Recording Mode>

The digital camera 100 has a still image/moving image simultaneous shooting and recording mode as a still image shooting mode. In the still image/moving image simultaneous shooting and recording mode, when the shutter button 60 is fully pressed, a still image is shot and recorded by the out-camera, and at the same time, the moving image shot by the out-camera before the shooting of the still image is also recorded in the external recording medium 91. In the still image/moving image simultaneous shooting and recording mode, moving images (short movies) are automatically recorded during each shooting of still images, and the moving images (short movies) recorded in the still image/moving image simultaneous shooting and recording mode are recorded in the same moving image file every time. Accordingly, the user can automatically create the moving image in the situation of shooting of the still image without having to perform any operation, and can obtain a digest moving image from which the moving images (short movies) acquired at a plurality of times of still image shooting can be viewed continuously. Hereinafter, the moving image file in which the moving images (short movies) are recorded in the still image/moving image simultaneous shooting and recording mode will be referred to as digest moving image file. The user can switch between the still image shooting modes by the mode selection switch included in the operation unit 62.

In the still image/moving image simultaneous shooting and recording mode, the in-camera shooting function can be activated or deactivated as described above. By activating the in-camera shooting function, the image shot by the in-camera can be recorded to be superimposed on the image shot by the out-camera. The user can activate or deactivate the in-camera shooting function by operating the operation unit. Alternatively, instead of setting the in-camera shooting function, the user may enable or disable display of the image shot by the in-camera such that the in-camera shooting function is activated when the display of the in-camera image is enabled, and the in-camera shooting function is deactivated when the display of the in-camera image is disabled.

In the still image/moving image simultaneous shooting and recording mode, the user can enable or disable the stop-motion setting by operating the operation unit. When the stop-motion setting is enabled, a stop-motion image is generated such that the shot still image is converted into a moving image. The created stop-motion image is recorded in the moving image file for the still image/moving image simultaneous shooting and recording mode. That is, following the moving image (short movie) shot before the still image shooting, the stop-motion image is recorded. When the stop-motion setting is disabled, no generation or recording of a stop-motion image is performed. When the stop-motion setting is enabled and the in-camera shooting function is activated, composite moving image is recorded in which the stop-motion image from the shot still image is composited with the moving image shot by the in-camera. In this example, the stop-motion image is a still video image. The process for converting one image data acquired by shooting the still image into moving image data is repeatedly performed to generate a predetermined time of moving image data. Since the predetermined time of moving image data is generated from one image data, the resultant still video image is formed such that the same image is continued without motion.

When the still image/moving image simultaneous shooting and recording mode is set and the moving image shooting button 70 is pressed, the moving image shooting and recording process is started by the out-camera but no shooting of a still image is performed. When the in-camera shooting function is activated, the moving image shot by the in-camera is composited and recorded, and when the in-camera shooting function is deactivated, only the moving image shot by the out-camera are recorded.

That is, while the still image/moving image simultaneous shooting and recording mode is set, the still image and the moving image are recorded when an instruction for shooting the still image is issued by the shutter button 60, whereas the moving image is recorded but no still image is recorded when an instruction for shooting the moving image is provided by the moving image shooting button 70.

<Shooting Process in the Still Image/Moving Image Simultaneous Shooting and Recording Mode>

Referring to FIGS. 3 and 4, the shooting operation by the digital camera 100 in the still image/moving image simultaneous shooting and recording mode will be described. The operation is implemented by the system control unit 50 controlling the components, performing calculations, making determinations according to the programs read from the non-volatile memory 51.

First, when the still image/moving image simultaneous shooting and recording mode is selected at the digital camera 100, an image for display is generated at step S301 based on the output of the imaging element 13 controlled in the correct exposure state by the exposure control unit 40. That is, an image for display is generated based on a main image shot by the out-camera. Hereinafter, the image generated from the output of the imaging element 13 in the out-camera will be referred to as main image. The generated image for display is temporarily stored in the memory 25.

At step S302, an image for movie recording (main moving image) is generated based on the main image as the output of the imaging element 13 in the out-camera. Hereinafter, the moving image generated from the output of the imaging element 13 in the out-camera will be referred to as a main moving image. The generated image for movie recording is temporarily stored in the memory 25.

At step S303, the in-camera setting in the digital camera 100 is verified. When the in-camera shooting function is activated, the process moves to step S304 to perform steps S304 to S308. When the in-camera shooting function is deactivated, the process moves to step S309 bypassing steps S304 to S308.

At step S304, the settings on the display position and display size of the in-camera in the digital camera 100 are acquired from the non-volatile memory 51. In this embodiment, the user can specify the display position and display size of the in-camera from the menu or the like, and the information on the set display position and display size is stored in the non-volatile memory 51.

At step S305, an in-camera image for display is generated based on the output of the imaging element 103 controlled in the correct exposure state by the exposure control unit 40. The size of the generated image is based on the size acquired at step S304.

At step S306, the main image for display generated at step S301 and the in-camera image for display generated at step S305 are composited into a composite image for display. In the thus created image, the in-camera image is superimposed on the main image. In the case where the in-camera image 501 is superimposed on the main image 500 for display, the position of the superimposition of the in-camera image 501 for display is determined according to the in-camera display position information acquired at step S304. The composite image for display generated at step S306 is temporarily stored in the memory 25 to overwrite the image for display stored in the memory 25 at step S301. That is, the main image generated at step S301 is replaced by the composite image generated at step S306 as the image for display stored in the memory 25. In this embodiment, the in-camera image is superimposed on the main image. Alternatively, a small main image may be superimposed on the in-camera image.

At step S307, an in-camera moving image for movie recording is generated based on the output of the imaging element 103 controlled in the correct exposure state by the exposure control unit 40. Hereinafter, the moving image generated from the output of the imaging element 103 in the in-camera will be referred to as in-camera moving image. The size of the generated in-camera moving image is based on the size acquired at step S304.

At step S308, the main moving image for movie recording generated at step S302 and the in-camera moving image for movie recording generated at step S307 are composited into a moving image for movie recording. At that time, the in-camera moving image for movie recording is superimposed on the main moving image for movie recording into the composite image based on the in-camera display position information, as at step S306, so that the moving image is composited at the same position as the image for display. That is, the size of the image for display generated at step S301 or S306 and the size of the image for movie recording generated at step S302 or S308 are different in both of the main image and the in-camera image. However, the image for display and the image for movie recording are generated such that the ratios of sizes of the main image and the in-camera image are the same, and the displayed image and the recorded image are identical. The composite moving image for movie recording generated at step S308 is temporarily recorded as an image for movie recording in the memory 25. That is, the main moving image generated at step S302 is replaced by the composite moving image generated at step S308 as the image for movie recording recorded in the memory 25.

At step S309, the image for display temporarily stored in the memory 25 is displayed on the display unit 28. That is, when the in-camera shooting function is activated, the composite image generated at step S306 is displayed, whereas when the in-camera shooting function is deactivated, the main image generated at step S301 is displayed.

At step S310, a moving image compression processing for the image for movie recording is started to read the image for movie recording from the memory 25, compress the read image by the image processing unit 20, and then store the compressed image in the memory 25. When the in-camera shooting function is activated, moving image data is generated based on the composite image generated at step S308. When the in-camera shooting function is deactivated, moving image data is generated based on the main image generated at step S302 and is stored in the memory 25. In addition, along with the compression of the moving image data, audio data input through a microphone not illustrated or the like is compressed by an audio compression processing included in the system control unit 50, and is stored in the memory 25. Steps S301 to S310 are basically repeated in the still image/moving image simultaneous shooting and recording mode. In this example, the compressed moving image data for up to four seconds is held in a ring buffer form in the memory 25.

At steps S301 to S310 as described above, the process for generating and displaying an image for display and the process for generating and compressing (temporary recording in the memory 25) an image for movie recording are carried out. The order in which these processes are performed is not limited to the foregoing one. The process for generating and displaying an image for display and the process for generating and temporarily recording an image for movie recording may be carried out in parallel.

At step S311, it is determined whether a mode change has taken place from the still image/moving image simultaneous recording mode. The mode change includes a transition to another shooting mode or a shift to a playback mode by the use of the mode selection switch, a shift to a setting menu by the use of the menu button, and power-off by the use of the power switch. When it is determined at step S311 that a mode change has occurred, the process moves to step S312 to terminate the moving image compression processing, discard the moving image data and the audio data stored in the memory 25, and exit the still image/moving image simultaneous recording mode. When it is determined at step S311 that no mode change has occurred, the process moves to step S313.

At step S313, it is verified whether any change has been made to shooting settings. The items of shooting settings include white balance, exposure correction value, focus method switch such as MF and macro shooting, shooting conditions required to be switched quickly depending on the subject and the situation during shooting such as the size and the compression rate of the still image, and others. These shooting settings are temporarily superimposed on the GUI screen displayed for the user to change the shooting settings, according to the user operation on a shooting setting change button included in the operation unit 62 or a touch panel on the display unit 28. The user can change the shooting settings by operating the operation unit 62 or the touch panel on the GUI screen. When it is determined at step S313 that any change has been made to the shooting settings, the process moves to step S314 to change the shooting settings according to the user operation. When it is determined at step S313 that no change has been made to the shooting settings, the process moves to step S315.

At step S315, it is determined whether any change has been made to the in-camera settings. The in-camera settings have items settable according to the user operation. The settable items include display position, display size, and activation/deactivation of the in-camera shooting function. The user can change the in-camera setting items by operating the operation unit 62 or the touch panel on the display unit 28.

It is determined at step S315 that any change has been made to the in-camera settings, the process moves to step S316 to stop the moving image compression processing and discard the moving image data and the audio data stored in the memory 25. This is for the purpose of preventing a situation where, due to a change in the in-camera display settings, switching in in-camera display between the moving image data recorded so far and moving image data to be captured after this will be recorded to reduce the quality of the moving image data. Subsequently, it is determined at step S317 whether the changed in-camera settings are on the activation and deactivation of the in-camera shooting function or not. When it is determined at step S317 that switching has taken place between activation and deactivation of the in-camera shooting function, the in-camera settings are activated or deactivated at step S318 according to the user's instruction. Then, the process returns to step S301 to perform steps S301 and subsequent steps again based on the changed settings. When it is determined at step S317 that the changed in-camera settings are not on the activation and deactivation of the in-camera shooting function but on the position and size of in-camera display, the position and size of in-camera display are changed according to the user's instruction at step S319. After that, the process moves to step S301 to perform again step S301 and subsequent steps according to the new settings.

When it is determined that no change has been made to the in-camera settings, the process moves from step S315 to step S320. At step S320, it is determined whether the shutter button 60 is half-pressed to input the SW1 signal. When the SW1 signal is not input, the process moves to step S322 bypassing step S321. When the SW1 signal is input, the process moves to step S321 to perform a focusing and exposure process according to the focus mode and the exposure mode set in the digital camera 100, that is, the shooting preparatory operation described above.

At step S322, it is determined whether the shutter button 60 is fully pressed to input the SW2 signal. When the SW2 signal is not input, the process returns to step S301 to repeat the process. When it is determined at step S322 that the SW2 signal is input, at step S323, the image display on the display unit 28 is temporarily stopped and the moving image compression processing started at step S310 is also temporarily stopped. At this time, the already stored moving image data and the audio data are held in the memory 25.

At step S324, still image data for recording (main still image) is shot based on the output of the imaging element 13 of the out-camera. At step S325, a review image for image verification is generated from the still image data shot at step S324. At step S326, the image processing unit 20 performs a still image compression processing on the still image data (main still image) shot at step S324 to generate still image data for recording (JPEG data), and stores the generated still image data in the memory 25. In the still image/moving image simultaneous shooting and recording mode, only the main image without superimposition of the in-camera image is recorded in the external recording medium 91 regardless of the activation or deactivation of the in-camera shooting function, and therefore the still image compression processing is performed on the main still image.

After that, the process moves to step S401 described in FIG. 4.

At step S401, the still image data (JPEG data) stored in the memory 25 at step S326 is recorded as one still image file (JPEG file) in the external recording medium 91.

At step S402, it is determined whether the recording time (shooting time) of the moving image data for movie recording stored in the memory 25 is longer than a predetermined time (t0). In this embodiment, t0=two seconds. When it is determined at step S402 that the moving image recording time is two seconds or longer, the process moves to step S403. When it is determined that the moving image recording time is shorter than two seconds, the process moves to step S404.

At step S403, the moving image data and the audio data stored in the memory 25 are recorded in the external recording medium 91. At that time, the moving image data and the audio data are recorded to be added to the digest moving image file recorded in the external recording medium 91. When there is no digest moving image file in the external recording medium 91, a new digest moving image file may be created so that the moving image data and the audio data read from the memory 25 can be recorded in that file. When the shooting date becomes changed or the size of the moving image data becomes larger than a predetermined size, a new digest moving image file may be created so that the moving image data can be recorded in that file. The recording format of the moving image data in the external recording medium 91 will be described later in detail with reference to FIGS. 6A to 6C. At step S404, the moving image data and the audio data stored in the memory 25 are discarded. That is, when the moving image recording time (shooting time) is shorter than two seconds, the moving image data and the audio data captured and temporarily saved in the memory 25 before the shooting of the still image at step S325 are not recorded or saved in the external recording medium 91. This is because it is not possible to verify the shooting situation from the extremely short moving image. Accordingly, in this embodiment, when the shooting time is shorter than two seconds, the moving image is not recorded in the external recording medium 91.

At step S405, the review image generated at step S325 is displayed on the display unit 28. This allows the user to verify the shot still image.

At step S406, it is determined whether the in-camera shooting function is activated or deactivated. When the in-camera shooting function is determined as activated, the process moves to step S407 to generate a moving image after still image shooting by compositing with an in-camera image at step S407 to S414. When the in-camera setting is deactivated, the process moves to step S418.

At step S407, a stop-motion image for movie recording is generated from the main still image shot by the out-camera at step S324. That is, the main still image is converted into moving image data. When the still image and the moving image recorded in the external recording medium 91 are different in aspect ratio, the main still image is resized such that the entire main still image is included in the stop-motion image, and the stop-motion image is generated such that the regions other than the main still image region are blackened. For example, when the still image has an aspect ratio of 4:3 and the moving image has an aspect ratio of 16:9, the stop-motion image is generated with the right and left regions blackened.

At step S408, as at step S305, an in-camera image for display is generated based on the output of the imaging element 103.

At step S409, as at step S306, a composite image for display is generated. However, at step S409, the composite image for display is generated by superimposing the in-camera image generated at step S408 on the main still image shot by the out-camera at step S324.

At step S410, as at step S307, an in-camera moving image for movie recording is generated based on the output of the imaging element 103.

At step S411, the composite image for display generated at step S409 is displayed on the display unit 28. In this example, the image shot by the in-camera is displayed as a moving image on the still image shot by the out-camera and recorded in the external recording medium 91.

At step S412, as at step S308, a composite moving image is generated as an image for movie recording by compositing with the in-camera moving image. However, at step S412, the composite image for movie recording is generated by superimposing the in-camera moving image generated at step S410 on the stop-motion image generated at step S407.

At step S413, as at step S310, the moving image compression processing is performed on the composite moving image generated at step S412 to generate moving image data, and the generated moving image data is stored as moving image data after still image shooting in the memory 25. Along with the compression of the moving image data, shutter sound data stored in advance in the non-volatile memory 51 and audio data input through a microphone or the like not illustrated are compressed by the audio compression processing included in the system control unit 50 and are stored in the memory 25.

At step S414, it is determined whether the moving image recording time (shooting time) of the moving image data after still image shooting generated at step S413 and stored in the memory 25 is equal to or longer than a predetermined time t1. In this embodiment, t1=two seconds. When it is determined that the moving image recording time of the moving image data is equal to or longer than two seconds, the process moves to step S420. When it is determined that the moving image recording time of the moving image data is shorter than two seconds, the process moves to step S408 to repeat steps S408 to S414. That is, when the in-camera shooting function is activated, after start of review display of the still image, the moving image is shot by the in-camera until the moving image recording time of the moving image data after still image shooting reaches two seconds. Then, the display of the composite image of the stop-motion image and the in-camera moving image and the moving image compression processing on the composite image are repeated until the moving recording time of the moving image data after still image shooting reaches two seconds.

At step S411, while the still image shot by the out-camera and recorded in the external recording medium 91 is displayed, the moving image is shot by the in-camera. Accordingly, it is possible to shoot the face expression of the user (shooter) verifying the shot still image on the display unit 28 by the in-camera and record the shot image together with the still image.

At step S415, it is determined whether the moving image recording time (shooting time) of the moving image data for movie recording captured before the shooting of the still image is equal to or longer than t0. Instead of determining on the moving image recording time, it may be determined whether the moving image cancelling process was performed at step S404. When the cancelling process was performed because the moving image recording time of the moving image before still image shooting is shorter than t0, the process returns to step S301 to repeat the process from the beginning. When it is determined that no cancelling process was performed because the moving image recording time of the moving image before still image shooting is equal to or longer than t0, the process moves to step S416.

At step S416, it is determined whether the stop-motion setting is enabled or disabled. When the stop-motion setting is enabled, the process moves to step S417, whereas when the stop-motion setting is disabled, the process returns to step S301.

At step S417, as at step S407, a stop-motion image is generated.

At step S418, the moving image compression processing is performed on the stop-motion image generated at step S417, and the compressed image is stored as moving image data after still image shooting in the memory 25. The audio data compressed at that time includes shutter sound data and silent data stored in advance in the non-volatile memory 51.

At step S419, it is determined whether the moving image recording time (shooting time) of the post-still image shooting moving image data subjected to the moving image compression processing and temporarily saved in the memory 25 at step S418 is equal to or longer than a predetermined time t2. In this embodiment, t2=one second. The moving image compression processing is repeatedly performed at step S418 on the same stop-motion image generated at step S417 until it is determined at step S419 that the moving image recording time of the moving image data after still image shooting is equal to longer than one second. The moving image data newly generated by the repeating is added to the moving image data after still image shooting already stored in the memory 25. Accordingly, as the moving image compression processing (step S418) is repeated, the number of the moving data (moving image frames) after still image shooting increases. Since the moving image data generated using the same stop-motion image is repeatedly recorded until the time t2 (one second) is reached, the moving image data after still image shooting constitutes a still video image of time t2 (one second).

At step S420, the moving image data after still image shooting generated by the moving image compression processing at step S413 or S419 is recorded in the external recording medium 91. The data is recorded to be added to the moving image data and audio data in the digest moving image file as at step S403. That is, when the moving image data before still image shooting is recorded at step S403, the moving image data after still image shooting is recorded subsequently from the recording of the moving image data before still image shooting.

At step S421, it is determined whether the recording of the moving image data after still image shooting at step S420 is completed. When it is determined that the recording of the moving image data after still image shooting is completed, the moving image data temporarily saved in the memory 25 is erased and the process returns to step S301.

<Digest Moving Image to be Recorded>

Figure 5A:
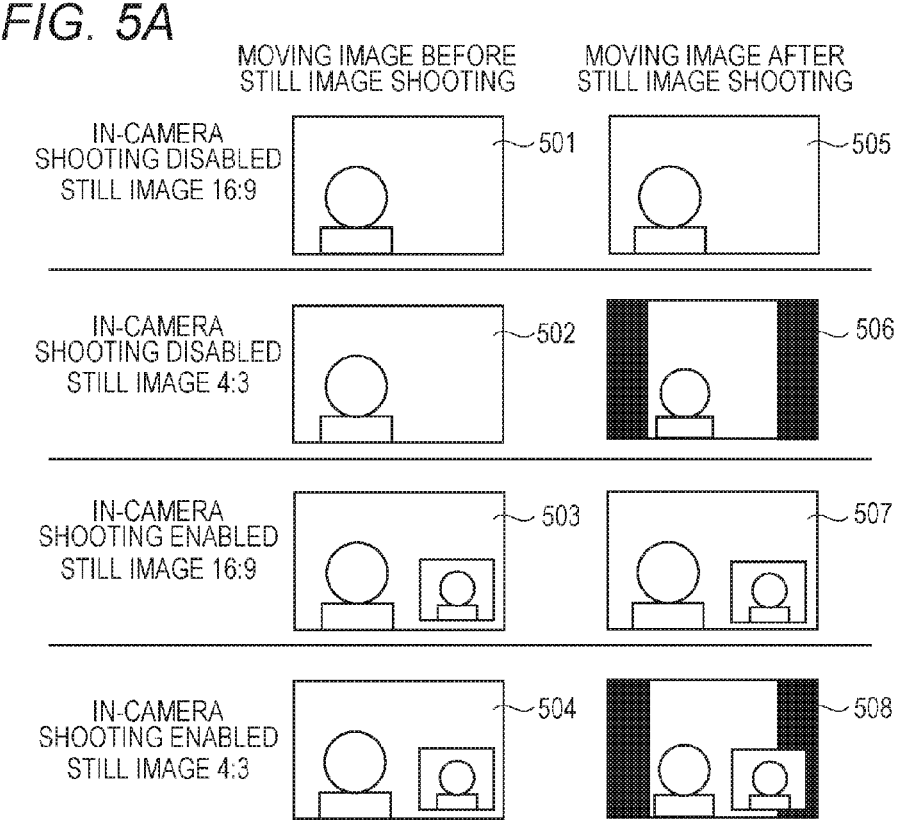
FIG. 5A is a diagram for describing images recorded as a digest moving image.

Next, the digest moving image to be recorded will be described with reference to FIGS. 5A and 5B.

First, when the in-camera setting is enabled, the digest moving image to be recorded in the still image/moving image simultaneous recording mode is recorded such that the in-camera image is superimposed on the image shot by the out-camera as illustrated with reference signs 503, 504, 507, and 508. When the in-camera setting is disabled, only the image shot by the out-camera are recorded as illustrated with reference signs 501, 502, 505, and 506. In addition, the digest moving image to be recorded varies depending on the settings on recording sizes of a still image. First, for the moving image before still image shooting, the moving image at an aspect ratio of 16:9 is recorded regardless of the shooting size (aspect ratio) of the still image. Meanwhile, for the moving image after still image shooting, the out-camera image (stop-motion image) is generated based on the still image, and therefore the generated moving image varies depending on the setting on the size (aspect ratio) of the still image. When the aspect ratio of the still image is 16:9, the stop-motion image is generated at the same aspect ratio from the still image and is recorded (505). When the in-camera setting is enabled, the in-camera moving image is superimposed on the stop-motion image and the composite image is recorded (507).

When the aspect ratio of the still image is 4:3, the aspect ratio of the digest moving image to be recorded is 16:9 and therefore the still image shot at 4:3 is resized into an image at 16:9 with an optical black image added to the right and left sides. Then, a stop-motion image is generated from the image generated with the addition of the optical black image, and the generated image is recorded as a moving image after still image shooting (506). When the in-camera setting is enabled, the moving image shot by the in-camera is superimposed on the stop-motion image generated with the addition of the optical black image to generate a moving image after still image shooting (508).

As in the foregoing, when the recording size of the still image is set at an aspect ratio different from the aspect ratio of the digest moving image, the optical black image is added to the moving image after still image shooting.

Figure 5B:
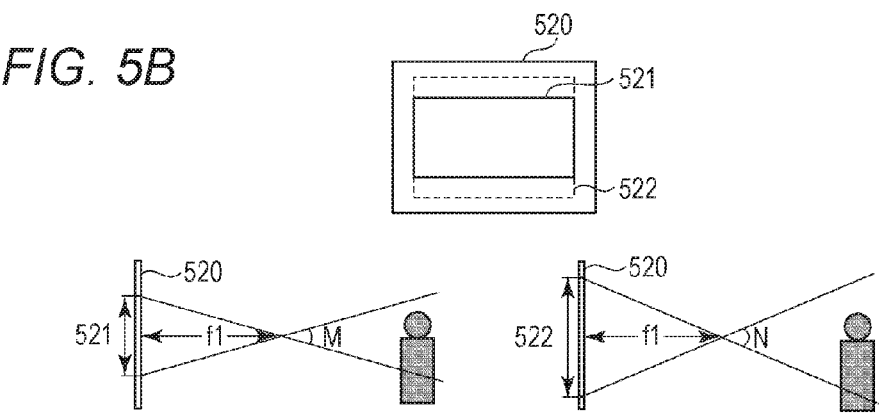
FIG. 5B is a diagram for describing angles of view (fields of view) of an image.

FIG. 5B illustrates an imaging element 520 (13) of the out-camera in which a region 522 for use at the aspect ratio of 4:3 is shown by broken lines. Meanwhile, a region 521 shown by solid lines is used to shoot an image at the aspect ratio of 16:9. The region 521 for use in shooting at the ratio of 16:9 is inscribed in the region 522 for use in shooting at the ratio of 4:3. Accordingly, the region 522 at 4:3 is vertically larger than the region 521 at 16:9. Therefore, when the vertical angle of view for shooting at 16:9 at a focal length f1 is designated as M (field of view) and the vertical angle of view for shooting at 4:3 at the same focal length f1 is designated as N (field of view), the relationship M<N is satisfied. As illustrated in FIG. 5A, when a still image is shot at 4:3, the still image at 4:3 is resized at the vertical ends according to a moving image shot before still image shooting at 16:9, and is recorded. Accordingly, the angle of view changes largely from M to N at the switching portion between the moving image before still image shooting and the moving image after still image shooting. The angle of view sharply changes in spite of the continuous image, which may give an impression of a discontinuous image at different scenes. Accordingly, the digital camera in this embodiment applies a playback effect such that the user can recognize a continuous image even though the angle of view sharply changes in the continuous image (moving image). The process for applying the reply effect will be described later.

<File Configuration and Moving Image Chapter Reference Information>

FIGS. 6A to 6C include diagrams for describing a configuration of image recorded in the still image/moving image simultaneous shooting and recording mode and chapter reference information for moving image. FIG. 6A shows the time-series relationship between a still image and a moving image shot and recorded in the still image/moving image simultaneous shooting and recording mode. FIG. 6B is a schematic view illustrating the recording format of the shot still image and moving image, and FIG. 6C shows a configuration example of the chapter reference information.

The time sequence of shooting instruction and image shooting will be described with reference to FIG. 6A. In the still image/moving image simultaneous shooting and recording mode, when the user presses fully the shutter button 60 to issue an instruction for shooting a still image (release), the SW2 signal is input to shoot a still image and a moving image, and the shot images are recorded. Reference sign P1 denotes a still image shot according to the instruction for shooting a still image by a release 1, M1 denotes a moving image relating to the still image P1 and shot before the shooting of the still image P1. Similarly, reference signs M2 and M3 denote moving images related to still images P2 and P3 and shot by releases 2 and 3, respectively.

The recording format of the still images P1 to P3 and the moving images M1 to M3 shot by the shooting operation described above with reference to FIG. 6A in the external recording medium 91 will be described with reference to FIG. 6B. In the still image recording process at step S401 and the moving image data recording process at steps S403 and S420, the still image files and the moving image files are recorded in the recording format described below.

The moving image M1 shot by the release 1 is saved under DCF rules as a moving image file "MDG_0001.MOV" (622) in a directory "100_1010" (directory 621) indicating the shooting date in the external recording medium 91. The subsequent file names will be decided under the DCF rules. Meanwhile, the simultaneously shot still image P1 is saved as a still image file "IMG_0002.JPG" (627) in the same directory (621). The M1 has no stop-motion image recorded. The M1 is recorded as a moving image stream in a chapter 1 (624). Then, the moving image M2 shot by the release 2 is added as a chapter 2 (625) to the moving image file "MDG_0001.MOV." Meanwhile, the simultaneously shot still image P2 is saved as a still image file "IMG_0003.JPG" (629) in the same directory (621). Accordingly, the stop-motion image generated from the P2 is inserted in the chapter 2 after the moving image M2. Then, as the moving image M3 shot by the release 3, the M3 shot before the shooting of the still image is not used but the stop-motion image P3 is recorded. The stop-motion image P3 is added as a chapter 3 (626) to the moving image file "MDG_0001.MOV". Meanwhile, the simultaneously shot still image P3 is saved as a still image file "IMG_0004.JPG" (629) in the same directory. Besides the moving image streams, audio data and chapter information are recorded in each of the chapter. As the chapter information, the shooting time information is recorded in character strings.

To add a chapter, chapter reference information (623) is described in the header of the moving image file "MDG_0001.MOV." By referring to the header, the information on the chapter can be acquired without having to analyze the entire moving image file. In the still image/moving image simultaneous shooting and recording mode, the still image and the moving image are recorded in a directory corresponding to the shooting date. When there is no directory corresponding to the shooting date, a new directory is created. Then, a moving image file is first generated in the directory corresponding to the shooting date, and then a still image file is generated. Accordingly, the file number (DCF number) of the moving image file is smaller than the file number (DCF number) of the still image file. In general, the file numbers (DCF numbers) are given to the files in order of generation. Thus, in the case of recording the still image data first and then recording the moving image data as illustrated in FIG. 4, it is verified whether there is a digest moving image file corresponding to the shooting date, and when there is no file, a new digest moving image file is generated prior to the recording of the still image. As in the foregoing, a plurality of moving images corresponding to a plurality of still images is recorded in one moving image file. However, the moving images corresponding to the plurality of still images are recorded in respective chapters, and thus the moving images can be distinguished from one another.

The information described in the header will be described with reference to FIG. 6C. The information described in the header includes information items 631 and 632 for moving image files, and information items 633 to 638 as the chapter reference information (623). The item 631 indicates the size of the moving image file that is updated to the value of the moving image file size described in a file entry at each addition of a chapter. The item 632 indicates the total number of frames in the moving image that is also updated at each addition of a chapter. The item 633 indicates the chapter number that is added as chapter information described later to each chapter at each addition of a chapter. The item 634 indicates the shooting date and time that are the same as the shooting date and time of the related still image in this example. Accordingly, the related still image and moving image can be associated with one another by the use of the shooting date-and-time information of the still image recorded in the still image files and the shooting date-and-time information 634 in the chapter reference information. The item 635 is the start frame of a chapter based on which the chapter can be directly played back. The item 636 indicates the number of frames in each chapter based on which the number of frames to be played back in the chapter can be decided. The item 637 indicates main image authentication information that includes identification information (name and others) of a person authenticated from the image shot by the out-camera at the time of shooting. The item 638 indicates main image face information that includes face information (face position and number of face(s)) detected from the image shot by the out-camera.

The item 639 indicates the presence or absence of a sub image from the in-camera and the composite position of the sub image based on which a playback control can be performed depending on the presence or absence of in-camera image(s), for example, a continuous playback of only the chapters with in-camera image can be performed.

The composite position information includes four items, that is, horizontal offset position X and vertical offset position Y of the sub image shot by the in-camera relative to the main image shot by the out-camera, horizontal width W of the sub image, and vertical width H of the sub image. Accordingly, in the corresponding chapters, it is possible to cut out and play only the area of the moving image (sub image) shot by the in-camera from the composite moving image in which the main image is composed with the moving image (sub image) shot by the in-camera. The item 640 indicates sub image authentication information that includes identification information (name and others) of a person authenticated from the image shot by the in-camera at the time of shooting. The item 641 indicates sub image face information that includes face information (face position and the number of face(s)) detected from the image shot by the in-camera. The main image face information 638 also includes the composite position and, for the detected face area, the vertical and horizontal offset positions relative to the main image and the vertical and horizontal dimensions of the main image. Similarly, the sub image face information 641 includes, for the detected face area, the vertical and horizontal offset positions relative to the sub image and the vertical and horizontal dimensions of the sub image. The item 642 is stop-motion information that indicates the presence or absence of a stop-motion image(s) and the frame range in which the stop-motion image(s) is inserted. In this example, the stop-motion information is expressed as relative frame information in the chapters. The information on the chapter 1 is 0-0 which explicitly indicates the absence of a stop-motion image. The information 90 to 179 on the chapter 2 indicates that the frames 90 to 179 in the chapter are a stop-motion image. In this example, the chapter 2 includes total 180 frames, and therefore the latter half of the chapter are a stop-motion image. The information on the chapter 3 indicates 0 to 179 and the number of frames in the chapter 3 is 180, which means that all the frames in the chapter 3 are a stop-motion image. According to the foregoing information, it is possible to determine the presence or absence of stop-a motion image(s) and the frame position(s) of the stop-motion image(s).

The item 643 indicates angle-of-view change information that describes whether the angle of view of the image sharply changes in the chapter. As described above with reference to FIG. 5, in the case where the stop-motion image is recorded, the angle of view may vary or may not change between the moving image shot before the shooting of the still image and the stop-motion image corresponding to the still image. This is because the information indicating whether the angle of view changes at the time of switching to the stop motion in the chapter is stored. As illustrated in FIG. 6C, the chapter 1 has no stop-motion image inserted therein and thus has no change in angle of view. In this case, the angle-of-view change information may not be recorded but the information indicating the absence of an angle-of-view change may be recorded. According to the angle-of-view change information, there is a change in angle of view in the chapter 2. The stop-motion information describes 90 to 179, which means that the frames 0 to 89 and the frames 90 to 179 differ in angle of view in the chapter 2, and the angle of view changes between the head and the frame 90 in the chapter 2. As in the foregoing, the angle-of-view change information can be used to determine whether there is a change in angle of view in the chapter. In this exemplary embodiment, as the angle-of-view change information, the information on whether there is a change in angle of view is recorded, but the information indicative of the frames with a change in angle of view may be recorded instead. Alternatively, the information indicative of the frames with a change in angle of view and the information indicative of the angles of view before and after the change may be recorded. To determine a change in angle of view from the thus recorded angle-of-view change information, the magnitude of the change in angle of view may be determined based on the recorded angle-of-view information, and when the change is small, it may be determined that there is no change in angle of view.

The maintenance of the chapter reference information described above is performed for consistency with the moving image stream at each editing of the moving image such as partial deletion. When the moving image is edited, the digital camera 100 performs appropriate maintenance of the information items 631 to 638 according to the editing contents, and changes the chapter information to update the moving image file by control of the system control unit 50. If the moving image is edited by an editing device incapable of parsing the chapter reference information, the chapter reference information loses consistency with the moving image stream and specifies an incorrect frame. Accordingly, in the digital camera of this example, when using the chapter reference information, the system control unit 50 determines whether there is a match between the file size (631) described in the chapter reference information and the file size described in the file entry. When there is no match, the system control unit 50 determines that there is no consistency between the chapter reference information and the moving image, and does not use the chapter reference information. Alternatively, in the event of detection of inconsistency, the system control unit 50 may re-generate chapter reference information from the chapter information and others in the stream and record the same.

<Album Playback Function>

In this exemplary embodiment, the digital camera 100 provides an option of album playback in the playback mode. In the album playback function, the digital camera 100 automatically extracts the images (still images and moving images) related to the image displayed when the album playback is selected from the plurality of images recorded in the external recording medium 91. Then, the digital camera 100 plays (displays) the extracted images in sequence or generates a moving image in which the extracted images are played in sequence.

Figure 7:
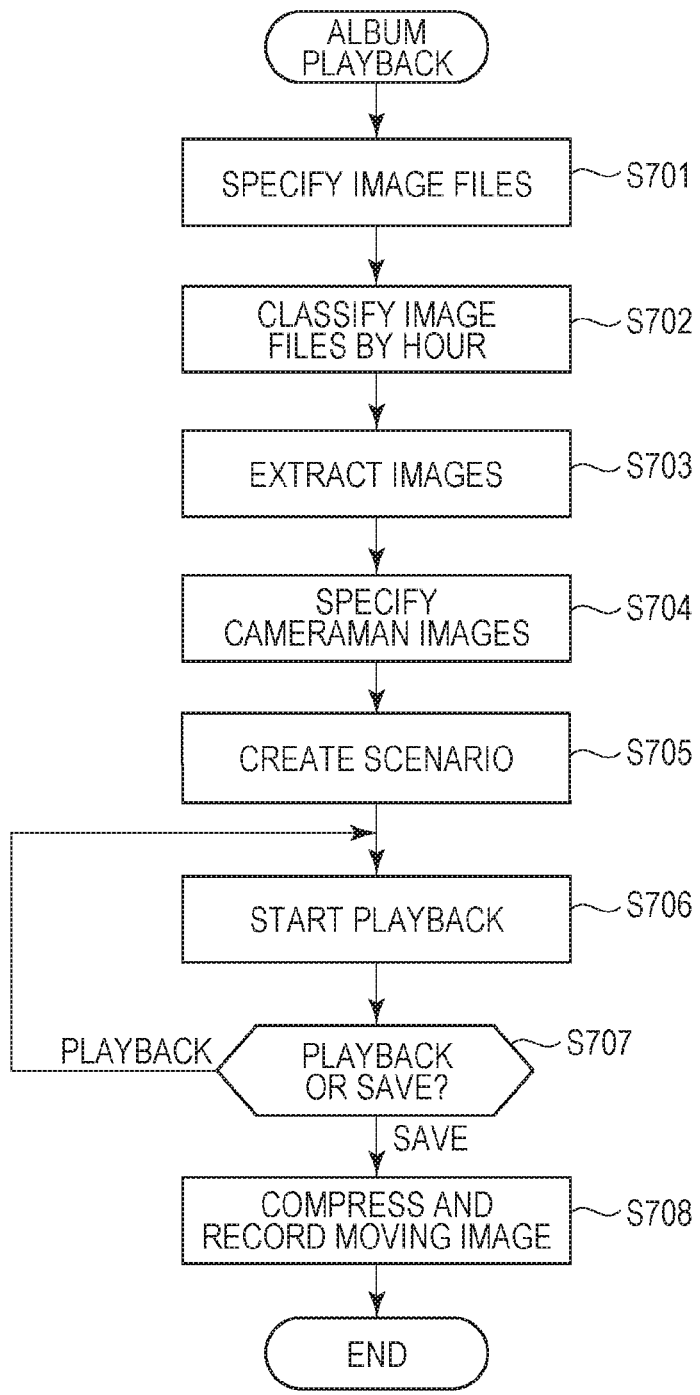
FIG. 7 is a flowchart of a process at the time of execution of an album playback function.

Operations of the digital camera 100 during the album playback will be described with reference to FIG. 7. This process is started by the user operating a predetermined operation unit to specify album playback during display of an image. The flowchart shown in FIG. 7 indicates the process executed by the system control unit 50 controlling the individual blocks in the digital camera 100 based on the program read from the non-volatile memory 51. In the album playback of this exemplary embodiment, a predetermined number of images is extracted from the image data captured at the designated date. Instead of this, a predetermined number of images may be extracted from the images related to a designated person, for example. Alternatively, a predetermined number of images may be extracted from the image data groups with higher user evaluation values (favorite degrees or ratings).

When the album playback is selected, the system control unit 50 first acquires the shooting date-and-time information of the image data lastly displayed on the display unit 28 at step S701. The system control unit 50 then determines the still image files recorded in the still image shooting mode, and the still image files and the moving image file recorded in the still image/moving image recording mode. The images included in the determined still image files and moving image file are to be subjected to album playback.

At step S702, the system control unit 50 classifies the determined still image files and the chapters in the moving image file into groups by hour (partial assemblies). For grouping, the files and chapters may be simply divided by one hour. However, the images may be continuously shot and thus the chapters may be classified by nearest neighbor method per unit almost equivalent to one hour.

At step S703, the system control unit 50 extracts images from each of the classified groups. The thus extracted images are subjected to album playback. In the album playback, the still images extracted as playback targets are displayed for four seconds, and the moving images in the extracted chapters are displayed. The target total playback time is about two minutes. That is, the number of scenes from the still images and the moving images are 2 (minutes)×60 (conversion to seconds)÷4 (seconds)=30 (scenes). In this example, in each of the groups, the moving image and the still image are separately evaluated and the moving image and the still image with higher evaluation values are extracted such that the ratio between the scenes of the moving images and the scenes of the still images becomes about 1:3. The display time of the still image is not fixed to four seconds. In this example, the display time of the still image is merely set to four seconds in agreement with the moving image for simplification of description.

A method for calculating the evaluation values of moving images will be described. In this example, the evaluation values of a moving image belonging in a certain chapter are calculated. First, evaluation values MovieValue [M] in a chapter [M] are calculated from the information indicating face position and the number of face(s) (face detection information) in the chapter reference information on the chapter [M]. Specifically, higher evaluation values are calculated as the position of the face detected in the chapter [M] is closer to the center, and higher evaluation values are calculated as the size of the face is larger. Further, the evaluation values of the image shot by the in-camera may be added to the calculation. For example, the evaluation values may be calculated from the information indicating face position and the number of face(s) in the image shot by the in-camera (face detection information) in the chapter reference information on the chapter [M]. Then, the calculated evaluation values are added to the evaluation values MovieValue [M]. In such a manner, the evaluation values of the moving image are calculated. The evaluation values of the still image are also calculated from information on the size, position, and number of face(s) in the still image, or the degree of smiling in the face.

At step S704, the system control unit 50 determines moving image chapters including the moving image for use in a cameraman display mode. In the cameraman display mode, only the image shot by the in-camera are displayed. In this exemplary embodiment, scenes with higher evaluation values of the image shot by the in-camera from the moving image chapters extracted at step S703 are used in the cameraman display mode. Accordingly, the system control unit 50 calculates the evaluation values of the image shot by the in-camera based on the chapter reference information on the chapters extracted at step S703 and the information indicating the position and number of face(s) in the image shot by the in-camera. Then, the system control unit 50 determines the top three chapters as moving image chapters including the moving image for use in the cameraman display mode.

When the digital camera 100 saves in advance a "dictionary" in which a characteristic image for determining persons and faces and identifiers are associated with each other, the system control unit 50 may select on a priority basis the image shot by the in-camera in the chapters including persons and faces registered in the "dictionary".

At step S705, the system control unit 50 displays the still images and the moving images extracted at step S703 in chronological order, and creates an album scenario for displaying the image cut out of the image shot by the in-camera in the chapters determined at step S704. In this exemplary embodiment, the scenario is created such that the still images are displayed for four seconds. The created scenario will be described later in detail. The system control unit 50 stores the generated scenario in the memory 25 for later use in album reply and saving processes.

At step S706, the system control unit 50 displays the images in series on the display unit 28 according to the scenario created at step S705 and stored in the memory 25. To display the still image corresponding to the still image file, the system control unit 50 performs control to read the still image files as playback targets according to the scenario from the external recording medium 91 through the card controller 90. The system control unit 50 then controls the memory control circuit 22, the image display memory 24, and the D/A converter 21 to decompress the image in the read still image files at the image processing unit 20 and display the same on the display unit 28. At that time, the control is performed such that the still image is displayed for four successive seconds. Meanwhile, to display the moving image corresponding to the determined chapters, the system control unit 50 determines the frames of a moving image in the moving image file including the chapters, according to the chapter reference information on the moving image file including the chapters. The system control unit 50 then refers to the header of the moving image file to determine the file offsets in the target frames, and controls the card controller 90 to read the target moving image data from the external recording medium 91 via the card controller 90. The system control unit 50 then decompresses the read moving image data at the image processing unit 20, and controls a display control unit 141 to display the images of the decompressed moving image data in sequence on the display unit 28.

Finally, a process in the cameraman display mode will be described. In this example, as described above, when the in-camera is activated in the still image/moving image recording mode, the image shot by the out-camera and the image shot by the in-camera are composited, and the composite image are compressed as a moving image and recorded in the recording medium. Accordingly, for display in the cameraman display mode, the composite position and composite size of the image shot by the in-camera are to be determined. In this example, the composite information (composite position and composite size) of the image shot by the in-camera is included in the chapter reference information, and therefore the image is cut-out (trimmed) based on the information to extract the image. The system control unit 50 thus determines the moving image in the chapter including the moving image for use in the cameraman display mode determined at step S704 according to the chapter reference information. The system control unit 50 then refers to the header of the moving image file to determine the file offsets of the target frames, and controls a recording playback unit 150 to read the target moving image data from the external recording medium 91. The system control unit 50 then causes the image processing unit 20 to decompress the read moving image data. The system control unit 50 then controls the image processing unit 20 to determine the composited regions of the image shot by the in-camera and cut out (trim) the regions. The system control unit 50 also controls the image processing unit 20 to composite the cut-out image and text information such as "cameraman," and controls the display control unit 141 to display the composite image on the display unit 28. At that time, the cut-out image shot by the in-camera may be moved to the center of the screen or increased in size.

At step S707, the user is prompted to select playing (displaying) or saving of the images extracted for the album playback. Specifically, the system control unit displays a selection screen on which the user is prompted to select playing or saving to be performed for the album playback on the display unit 28. The user operates the operation unit 62 to select replying or saving. The system control unit 50 determines whether an instruction for playing or saving is input. When an instruction for playing is input (playing at step S707), the process returns to step S706 to execute again the album playback process.

When an instruction for saving is input at step S707, the system control unit 50 generates moving image data based on which images can be displayed under the scenario. The system control unit 50 controls the image processing unit 20 and records the moving image generated by the image processing unit 20 in the external recording medium 91. At that time, the system control unit 50 compresses the images for display under the scenario by the use of a compression encoding technique such as H.264 or H.265 to generate the moving image data.

As described above, the digital camera 100 in this example can automatically extract the images with higher evaluation values from a plurality of image groups recorded in the external recording medium 91 for the album playback within a predetermined range or narrowed according to conditions, and display the extracted images in series. The system control unit 50 can also generate the same moving image data as that for the album playback so that the same display as that for the album playback this time can be provided later.

<Scenario and Album Playback Under Scenario>

The scenario for the album playback generated at step S705 and the album playback at step S706 will be described in detail with reference to FIGS. 8A and 8B.

Figure 8B:
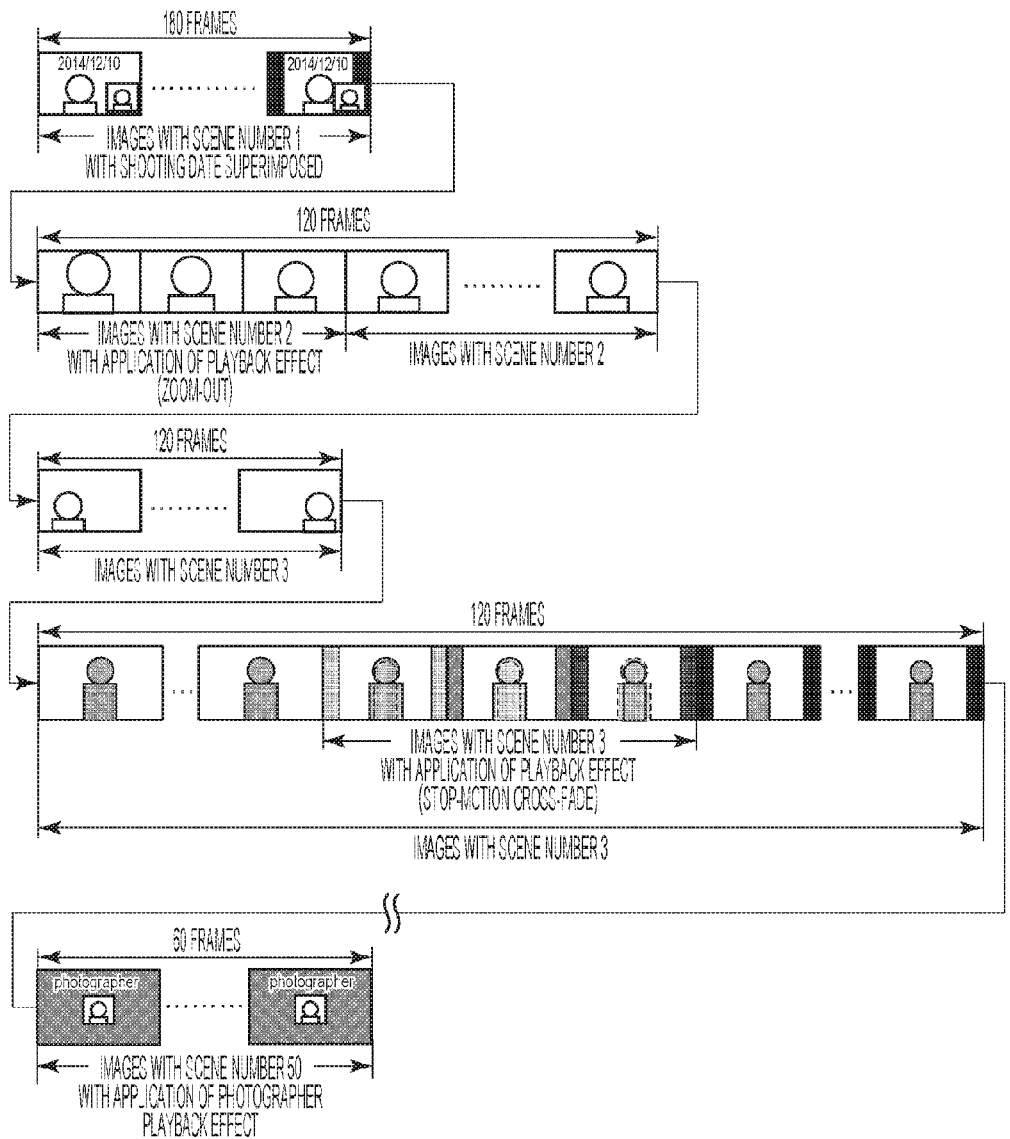

FIGS. 8A and 8B illustrate examples of the created scenario and image display for the album playback.

FIG. 8A illustrates an example of the scenario generated at step S705.

Reference sign 801 indicates scene number information that describes a scene number in an album scenario.

Reference sign 802 indicates file path information that describes a file path for the image played back in the scene.

Reference sign 803 indicates a chapter to be played back when a moving image file is indicated by the file path information 802.

Reference sign 804 indicates display frame number information that describes the number of frames forming the scene. In this example, the display time for one frame is 1/30 second, that is, 30 frames are displayed in one second.

Reference sign 805 indicates playback effect information that describes the types of playback effect to be applied to the image in display. The types of playback effect include zoom-out, slide, stop-motion cross-fade, shooter, no effect, and the like. Reference sign 806 indicates sub effect information that indicates supplementary information for the playback effect information 805.

Reference sign 807 indicates background color information that describes the background color of "cameraman effect."

Reference sign 808 indicates character string information that describes the character string to be superimposed on the image. Raster data corresponding to the character string is stored in advance in the non-volatile memory.

At step S705, the system control unit 50 generates the scenario as illustrated in FIG. 8A for the album playback of the still images and the chapters of the moving images extracted as playback targets at step S703. The system control unit 50 generates the scenario in such a manner as described below.

The system control unit 50 assigns scene number to the still images and the chapters of the moving images extracted as playback targets at step S703, in order in which the images are played. The system control unit 50 then describes the file path indicating the still image or the moving image as the file path information 802 for each image extracted as a playback target. For the moving image as a playback target, the system control unit 50 describes the number for the chapter as a playback target as the chapter information 803. The system control unit 50 describes the number of frames constituting the scene, that is, the period of time during which the image as a playback target are to be displayed as the display frame number information 804. In this exemplary embodiment, the still image is set to be displayed for four seconds. Accordingly, for the still image as a playback target, the system control unit 50 describes 120 as the display frame number information 804. For the moving image as a playback target, the system control unit 50 describes the number of frames in the chapter as a playback target such that the entire chapter designated as a playback target can be displayed.

The playback effect information 805 describes the types of playback effects to be applied to the image as a playback target. The types of playback effects include "zoom-in," "zoom-out," "slide," "stop-motion cross-fade," "cameraman," "no effect," and the like. The playback effects "no effect," "zoom-out," "zoom-in," and "slide" are applied at random to the still image as a playback target. The playback effect "no effect" or "stop-motion cross-fade" is applied to the moving image as a playback target. Whether the "stop-motion cross-fade" effect is to be applied to the moving image as a playback target is decided with reference to the angle-of-view change information in the chapter reference information on the moving image chapter as a playback target. As described above with reference to FIG. 5, in the still image/moving image recording mode, the aspect ratio of the still image may be set differently from the aspect ratio (16:9) of the digest moving image. In this case, the angle of view of the moving image is changed during display of the moving image (chapter). Accordingly, the recorded moving image (chapter) appears to be temporally discontinuous due to the change in angle of view even though they actually constitute one continuous movie. In this exemplary embodiment, the stop-motion cross-fade effect is applied to the scene (moving image chapter) described as having a change in angle of view in the angle-of-view change information. In the stop-motion cross-fade effect, a cross-fade effect is applied to the moving image when the angle of view is changed by insertion of a stop-motion image, that is, to the frames before and after the change in angle of view. This process will be described later in detail. When the playback effect information 805 describes any playback effect, the system control unit 50 describes supplementary information for use in the application of the playback effect as sub effect information 806. For example, when the playback effect information 805 indicates zoom-out, the system control unit 50 describes the degree of zoom-out with the angle of view of the entire still image as 100%. When the playback effect information 805 indicates slide, the system control unit 50 describes the position at which the slide is to be stared or the direction of the slide and the like. When the playback effect information 805 indicates stop-motion cross-fade, the system control unit 50 describes the stop-motion start frame in the chapter and the information on whether the in-camera image is composited. For the scene number 1, the system control unit 50 describes the shooting date as the character string information 808 so that the shooting date of the image for the album playback can be known. When the playback effect is cameraman effect, the system control unit 50 describes the background color as the background color information 807 and describes "Cameraman" as the character string information 808. In addition, the system control unit 50 describes the information indicating the regions of the in-camera image composited in the image as a playback target (vertical and horizontal offset positions and vertical and horizontal sizes) as the sub effect information 806. The album playback is performed at step S706 under the thus created scenario.

Next, the album playback performed at step S706 will be described. The following process is executed by the system control unit 50 performing calculation processing and controlling the components in the digital camera 100.

Since the images are played back in order of scene numbers, the following process is performed sequentially from the image with scene number 1. The image is read from the external recording medium 91 based on the file path information 802 corresponding to the scene number. For the moving image, the entire moving image file is not read but only the chapter designated by the chapter information 803 is read. To display the read image, the image as a playback target is displayed on the display unit in the length corresponding to the number of frames designated by the display frame number information 804. When a playback effect is set in the playback effect information 805, the playback effect is applied to the image before display by the image processing unit 20 using the playback effect information 805 and the sub effect information 806. When a character string is set in the character string information 808, the designated characters are superimposed by the image processing unit 20 on the image at a predetermined position. When the "cameraman" is set as a playback effect, the playback effect is applied to the image before display by using not only the sub effect information but also the background color information 807 and the character string information 808. To apply the cameraman effect, the in-camera region designated by the sub effect information is cut out from the image as a playback target designated by the file path information. Then, the cut-out in-camera image and the characters designated by the character string information are superimposed on the solid image before display in the background color designated by the background color information.

By performing the foregoing process on all the scenes in sequence, it is possible to automatically apply the playback effect to the images extracted as playback targets for the album playback, and display the same in sequence on the display unit 28.

FIG. 8B is a diagram illustrating the images played (displayed) in the album playback under the scenario described in FIG. 8A.

First, the image with scene number 1 is played. Since the image designated by the file path is a moving image, the chapter information is referred to and only the chapter 1 designated by the chapter information is played. No playback effect is set but the shooting date is designated by the character string information, and therefore the composite image with the shooting date superimposed is displayed for 180 frames designated by the display frame number information.

Then, the image with scene number 2 is played. Since the image designated by the file path is a still image, the chapter information is not referred to. Since zoom-out is designated as a playback effect, the image with the zoom-out effect is first displayed, and then the still image is displayed as they are (without the playback effect). The image with and without the zoom-out playback effect is displayed for 120 frames designated by the display frame number information.

Then, the image with scene number 3 is played. Since the image designated by the file path is a moving image, the chapter information is referred to and only the chapter 2 designated by the chapter information is played. Without the playback effect, the image is displayed for 120 frames designated by the display frame number information.

Then, the image with scene number 4 is played. Since the image designated by the file path is a moving image, the chapter information is referred to and only the chapter 5 designated by the chapter information is played. Since stop-motion cross-fade is designated as a playback effect, the image with the stop-motion cross-fade effect is displayed for 120 frames designated by the display frame number information. The stop-motion cross-fade process will be described later in detail.

The images are sequentially played as described above. Since the shooter is designated as a playback effect for the image with scene number 50, and the image designated by the file path is displayed as the cut-out image regions designated by the sub effect information together with the character string designated by the character string information. That image is displayed for 60 frames designated by the display frame number information.

<Flowchart of the Album Playback Process>

Figure 9:
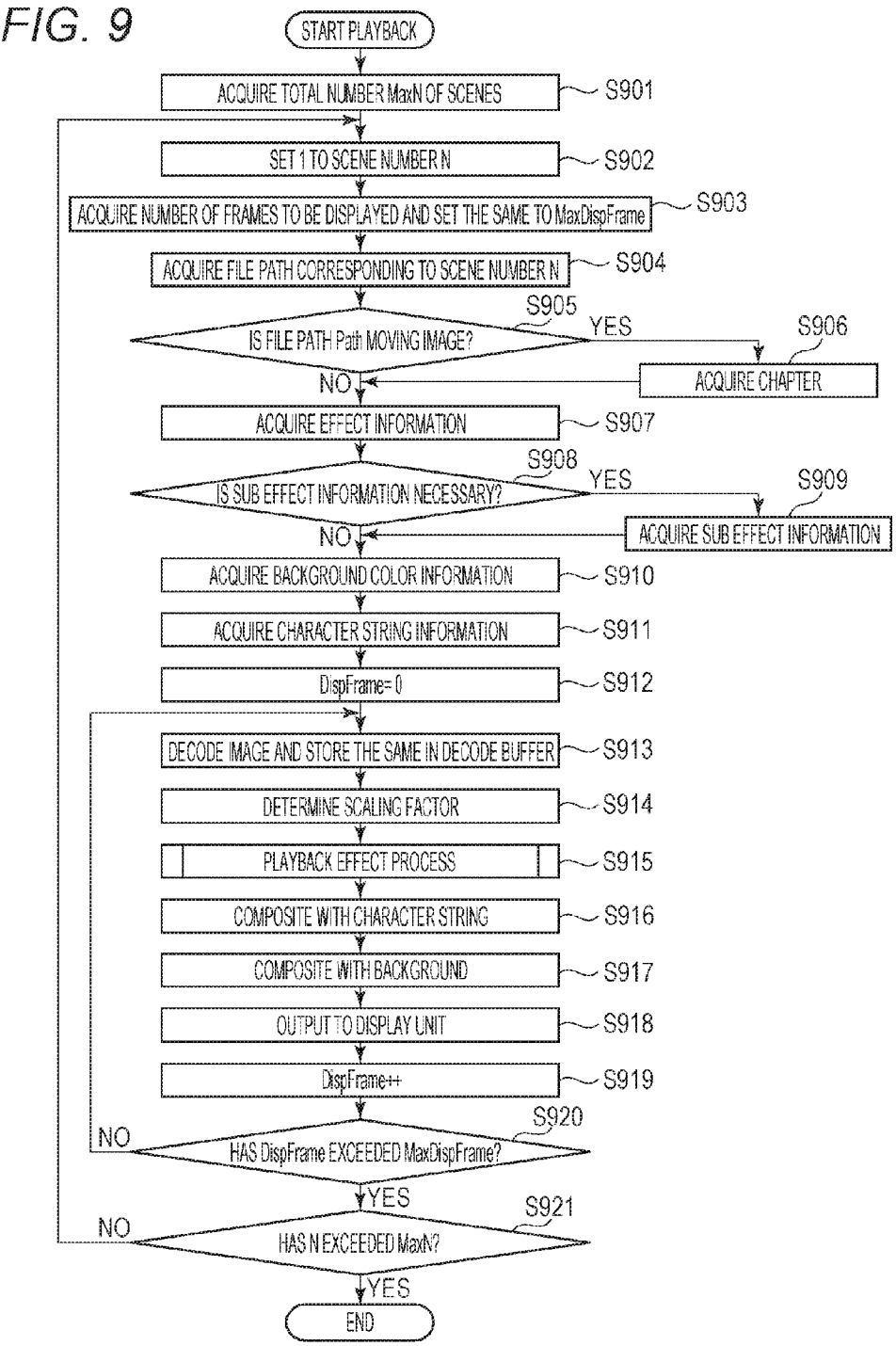
FIG. 9 is a flowchart of an album playback process.

FIG. 9 is a flowchart of the detailed process of album playback described above.

First, at step S901, the total number MaxN of scenes is acquired from the scenario created at step S705 and saved in the memory 25. In the case of the scenario described in FIG. 8A, the number 1600 is acquired.

At step S902, the currently displayed variable N of the scene number is set to the initial value of 1.

At step S903, the display frame number information 804 corresponding to the scene number N is acquired and set in MaxDispFrame. When the scene number N is 1 in the scenario of FIG. 8A, MaxDispFrame is 180.

At step S904, the file path Path corresponding to the scene number N is acquired from the file path information 802. When the scene number N is 50 in the scenario of FIG. 8A, Path is DCIM/100_1010/MDG_0001.MP4.

At step S905, it is determined whether the acquired file path Path designates a moving image.

When the file path designates a moving image, the process moves to step S906 to acquire the chapter information 803 and determine the part of the moving image to be played back.

At step S907, the playback effect information 805 is acquired from the scenario saved in the memory 25.

At step S908, it is determined whether the sub effect information is necessary for the playback effect designated by the acquired playback effect information 805. When the sub effect information is necessary, the sub effect information 806 is acquired at step S909.

At step S910, the background color information 807 is acquired in the same manner.

At step S911, the character string information 808 is acquired in the same manner.

At steps S910 and S911, as at steps S908 and S909, it may be determined whether the background color information or the character string information is necessary based on the playback effect information 805, and the information may be acquired only when it is determined as necessary.

At step S912, the initial value of 0 is substituted into the variable DispFrame indicative of the currently displayed frame number.

At step S913, the image to be displayed is read from the external recording medium 91 through the system control unit 50 and the card controller 90, decoded by the image processing unit 20, and then stored in the memory 25. When the file corresponding to the file path Path contains a still image, the still image is read and recorded. When the file corresponding to the file path contains a moving image, the head to the DispFrame-th frame in the chapter designated by the chapter information from the file corresponding to the file path Path, are read from the external recording medium 91 and decoded.

At step S914, the zoom ratio for use in resizing the decoded image is calculated based on the display size of the display unit 28. The zoom ratio is determined from the ratio between the size after decoding at step S913 and the display size of the display unit 28. When the size after decoding is HD (1280×720) and the display size of the display unit 28 is 640×360, the image is scaled by 0.5 time.

At step S915, the image to be displayed (image in DispFrame) is acquired. When the playback target is a still image, the image processing unit 20 performs the zooming process on the decoded image at the zoom ratio determined at step S914, and performs the playback effect process on the decoded image based on the effect information and the sub effect information.

At step S916, the character string is superimposed on the acquired image to which the playback effect was applied at step S915 based on the character string information acquired at step S911.

At step S917, the solid image background in the background color acquired at step S910 is superimposed on the acquired image to which the playback effect was applied at step S915.

When no character string or background color is set, S916 and S917 can be skipped.

At step S918, the image (frames) acquired at steps S913 to S917 is displayed on the display unit 28.

At step S919, DispFrame is incremented by one.

At step S920, it is determined whether DispFrame exceeds MaxDispFrame. When it is determined that DispFrame exceeds MaxDispFrame, the process moves to step S921. When it is not determined so, the process returns to step S913. That is, steps S913 to S919 are repeated until DispFrame reaches MaxDispFrame. When the playback target is a still image, the same process is repeated at step S913. Accordingly, when the still image is to be played and DispFrame>0, that is, when step S903 is repeated, step S913 may be skipped.

At step S921, it is determined whether the scene number N exceeds the total scene number MaxN. When it is determined that the scene number N exceeds the total scene number MaxN, the process is terminated. When it is not determined so, the process returns to step S902.

<Playback Effect Process>

Next, the playback effect process at step S915 will be described in detail with reference to the flowchart in FIG. 10 and the illustrative diagram of the stop-motion cross-fade process in FIGS. 11A and 11B.

Figures 11A, 11B:
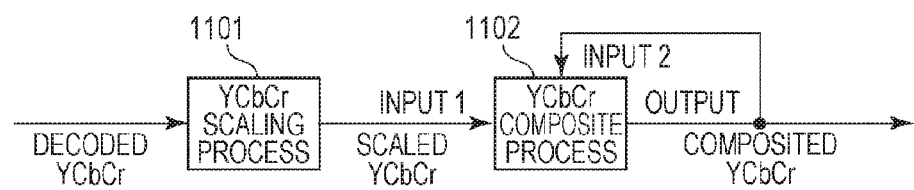
FIGS. 11A and 11B include diagrams for describing the playback effect process.

FIG. 11A is a block diagram of the cross-fade process. The process is executed by the image processing unit 20.

The image decoded at step S913 (image in YCbCr format) is subjected to a zooming process at 1101. In the zooming process, the image is resized at the zoom ratio set at step S914.

The resized YCbCr image data is input into an input 1 of an YCbCr composite processing block 1102. Then, the YCbCr composite image composited in the YCbCr composite processing 1102 is output and input to an input 2 of the YCbCr composite processing block 1102. In the YCbCr composite processing block 1102, the two images from the input 1 and the input 2 are composited at the set composite ratio and then output. The composite ratio is variable under control of the system control unit 50. When the input 1:the input 2=100:0, the image from the input 1 is output.

Figure 10:
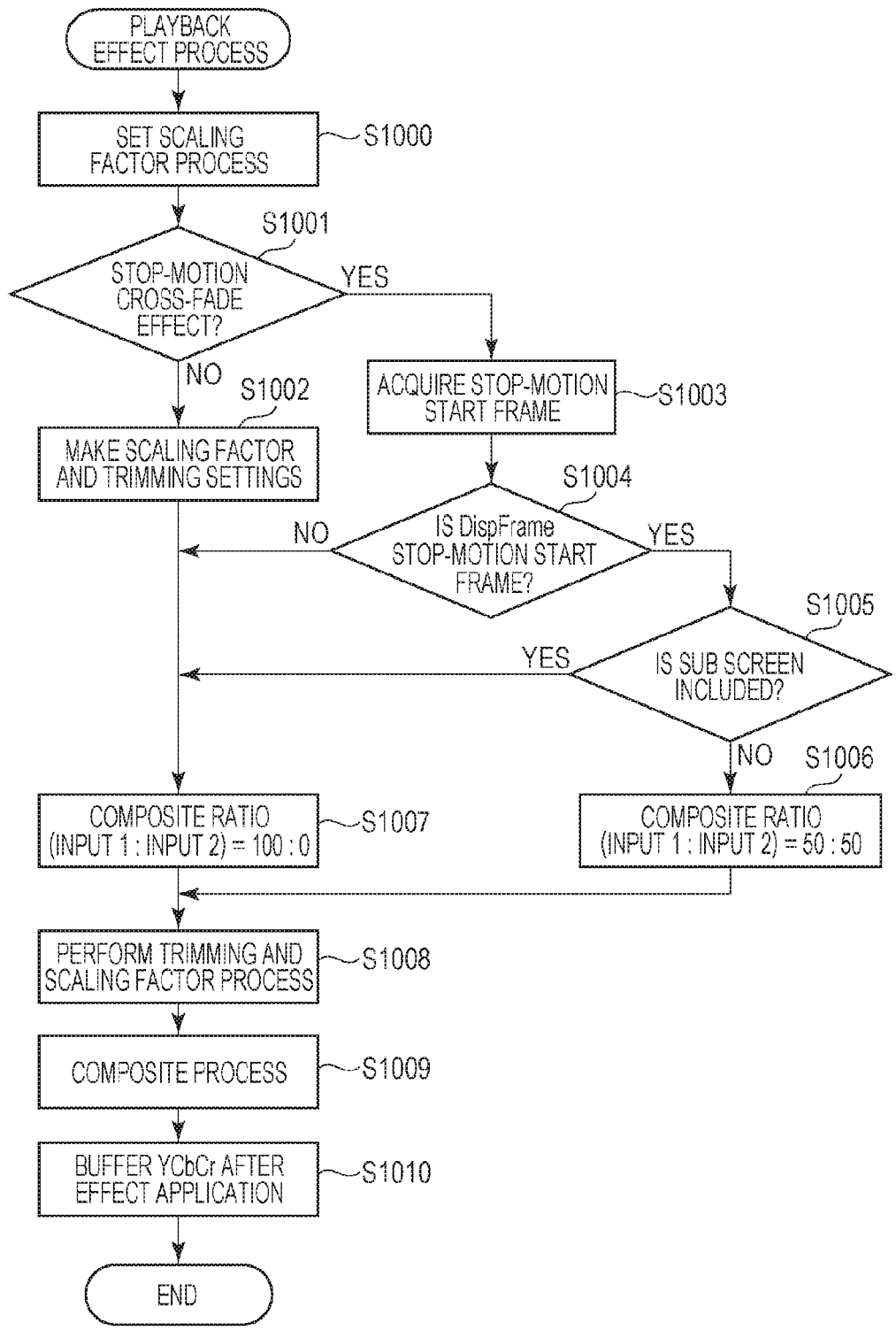
FIG. 10 is a flowchart of a playback effect process.

FIG. 10 is a flowchart of the playback effect process at step S915. The playback effect process will be described in detail with reference to this flowchart. The process is executed according to the program read by the system control unit 50 as in the case of FIG. 7.

First, at step S1000, the zoom ratio calculated at step S914 is set to the YCbCr zooming process 1101.

At step S1001, it is determined whether the playback effect information 805 acquired at step S907 indicates "stop-motion cross-fade." When the playback effect information 805 is determined as "stop-motion cross-fade," the process moves to step S1003. When it is not determined so, the process moves to step S1002.

At step S1002, the zoom ratio and the trimming range are reset according to the set effect and are added to the YCbCr zooming process 1101. For example, when the zoom-in and zoom-out are set, the zoom ratio is changed based on the sub effect information 806. When the cameraman effect is set, the region where the in-camera image is composited is determined from the sub effect information 806, and the image in the region is trimmed.

At step S1003, the stop-motion start frame is acquired from the sub effect information 806. In the case of the stop-motion cross-fade, the sub effect information 806 describes the stop-motion start frame and whether the in-camera image is composited. Accordingly, the information is acquired from the sub effect information 806.

At step S1004, the currently processed DispFrame is the stop-motion start frame or subsequent one. When it is determined that the DispFrame is the stop-motion start frame or subsequent one, the process moves to step S1005. When it is not determined so, the process moves to step S1007.

At step S1005, it is determined from the sub effect information whether the in-camera image is composited on the stop-motion image. When it is determined that the in-camera image is composited, the process moves to step S1007. When it is not determined that the in-camera image is composited, the process moves to step S1006.

At step S1006, the composite ratio in the YCbCr composite processing 1102 is set to (input 1, input 2)=(50, 50), and then the process moves to step S1008. By setting the composite ratio to (input 1, input 2)=(50, 50), the image is composited to apply the cross-fade effect.

At step S1007, the composite ratio in the YCbCr composite processing 1102 is set to (input 1, input 2)=(100, 0), and then the process moves to step S1008. When the composite ratio is set to (input 1, input 2)=(100, 0), the image from the input 1 is output and thus no composite is performed or no cross-fade process is performed. That is, even though the angle of view is changed due to the insertion of the stop-motion image, when the in-camera image is composited with the stop-motion image, no cross-fade effect is applied. Alternatively, whether the in-camera image is composited may be determined not at step S1007 but at the time of creation of the scenario, and when it is determined that the in-camera image is composited, the playback effect may be set to "no effect."

At step S1008, trimming and zooming processing are carried out in the YCbCr zooming process 1101 according to the zoom ratio and the trimming setting set at steps S1000 and S1002.

At step S1009, the composition processing is performed in the YCbCr composite processing 1102 at the composite ratio set at step S1006 or S1007. At that time, the image data in the currently processed DispFrame is input as input 1, and the image data output in the previous process is input as input 2.

At step S1010, for the effect process for the next frame, the processed image data is subjected to buffering. That is, the image data after the composite processing constitutes the next input 2.

The image having thus undergone the stop-motion cross-fade process will be described with reference to FIG. 11B.

First, referring to FIG. 11B, the stop-motion image is inserted and the angle of view is changed from the 60th frame. Accordingly, for the DispFrames with the number 59 and smaller ones, the composite ratio is "input 1, input 2)=(100, 0). For the DispFrames with number 60 and larger ones, the composite ratio is (input 1, input 2)=(50, 50). For the DispFrames 58 and 59, the composite ratio is (input 1, input 2)=(100, 0), and therefore the image from the input 2 is not composited but the image to be processed input as the input 2 is output as it is. For the DispFrame 60, the composite ratio is (input 1, input 2)=(50, 50) and therefore an input image 1113 to be processed and a previously output image 1132 (the same as the image 1112) are composited and a composite image 1133 is output. Then, for the DispFrame 61, an image to be processed 1114 and a previously processed image 1133 are composited and a composite image 1134 is output. In this manner, the previously output image and the currently processed image are composited to produce a playback effect by which the image appears to be gradually switched. The image with number 60 and subsequent ones is a stop-motion still video image, and the same image is repeatedly composited and converged into a stop-motion image.

In this exemplary embodiment, even when no cross-fade process is performed, the YCbCr composite processing 1102 is performed at the composite ratio of (input 1, input 2)=(100, 0). Alternatively, for reduction of processing load, the composite processing may not be performed in the foregoing case. When the cross-fade process is performed, the composite processing is repeatedly performed to converge the image into a stop-motion image. Therefore, after the composite processing has been performed on a predetermined number of frames (for example, 30 frames), the composite processing may be stopped there. In this exemplary embodiment, in the composite processing with stop-motion cross-fade, the composite processing is started from the stop-motion start frame to composite the previously displayed frames and the currently played frames. Alternatively, the composite processing may be started from the frame preceding by one the stop-motion start frame such that the preceding frame and the frame to be next displayed are composited.

As described above, in the digital camera of this exemplary embodiment, when the image different in moving image aspect ratio is inserted into one chapter of the digest moving image, the stop-motion cross-fade effect can be applied as a playback effect to play the image such that changes in angle of view become less prominent.

In this exemplary embodiment, when the album playback is performed by the use of the album playback function, the stop-motion cross-fade effect is applied as a playback effect. However, the stop-motion cross-fade effect is not limited to this application but may also be applied when the angle of view is changed during play of a series of moving images recorded in temporally continuous manner to play a digest moving image or play only the chapters including a stop-motion image. In addition, not only when the angle of view is changed but also when the image is largely changed even though the image is continuously recorded, the change may be detected and the cross-fade process may be performed at the point of the change.

In the foregoing exemplary embodiments, the system control unit 50 creates a scenario from the image file information and the chapter reference information, and determines whether the stop-motion cross-fade process is to be performed and from which frame the process is to be started under the created scenario. Alternatively, the system control unit 50 may not create a scenario but may determine whether the stop-motion cross-fade process is to be performed and from frame which the process is to be started based on the image file information and the chapter reference information. In addition, the system control unit 50 may analyze the moving image and determine whether the stop-motion cross-fade process is to be performed from the analysis results, not based on the image file information and the chapter reference information. For example, the system control unit 50 may determine whether optical black image regions exist at right, left, upper, and lower ends of the image in a moving image frame, and when optical black image regions appear from not the first frame but a middle frame, the system control unit 50 may determine that the angle of view is changed and perform the stop-motion cross-fade process.

In relation to the foregoing exemplary embodiments, detailed descriptions have been given as to the case where the stop-motion cross-fade process is performed in the playback process of album playback. However, when saving is selected in the album playback, the image data to be played is generated and converted into moving image data without displaying them as in the play process, whereby the same image as those displayed in the playback process are recorded in a moving image file.

(Other Exemplary Embodiments)

The exemplary embodiments of the present invention have been described so far. However, the present invention is not limited to these exemplary embodiments but can be modified and changed in various manners without deviating from the gist of the present invention.

In the foregoing exemplary embodiments, the imaging device to which the present invention is applied is taken as an example. However, the present invention is also applicable to other electronic devices such as camera-equipped cellular phones and mobile game machines. In addition, the functions of the foregoing exemplary embodiment may not be implemented in one device but may be implemented in a system to which an imaging device with a plurality of imaging units, a display device with a display unit, and a control device having a CPU, ROM, and DRAM and controlling the imaging device and the display device are connected together. Further, the image playback process may be performed not on the imaging device but on an image playback device capable of acquiring the image shot by the imaging device. Furthermore, parts of the foregoing exemplary embodiments may be combined together as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263038, filed Dec. 25, 2014, which is hereby incorporated by reference herein in its entirety.

What is claimed is:
1. An image processing device, comprising:
at least one processor; and
a memory coupled to the at least one processor and storing instructions that, when executed by the at least one processor, cause the processor to perform operations comprising:
determining to apply a predetermined effect to a moving image in a case where an angle of view or an aspect ratio is changed in the moving image, and
applying the predetermined effect to the moving image according to the determination,
wherein, when a sub moving image is composited with the moving image, in the case where an angle of view or an aspect ratio is changed in the moving image, the predetermined effect is not applied to the moving image.

2. The image processing device according to claim 1, wherein the determining determines whether the angle of view is changed in the moving image recorded in a temporally continuous manner.

3. The image processing device according to claim 1, wherein the determining determines whether an image with an aspect ratio different from the aspect ratio of moving image recorded in a temporally continuous manner is inserted into the moving image.

4. The image processing device according to claim 1, wherein, when the determining determines that the angle of view or the aspect ratio is changed, the applying applies the predetermined effect to part of the moving image in which the change is determined.

5. The image processing device according to claim 1, wherein the predetermined effect is a cross-fade effect.

6. The image processing device according to claim 1, wherein the applying applies the predetermined effect by compositing a frame to which the predetermined effect is to be applied with a frame preceding or following the frame in the moving image.

7. The image processing device according to claim 2, wherein the determining determines whether the angle of view is changed in one chapter of a moving image.

8. The image processing device according to claim 1, wherein the applying applies the predetermined effect to a middle point in a chapter of the moving image, not a pause between chapters of the moving image.

9. The image processing device according to claim 1, wherein the moving image to which the predetermined effect is applied is played back or recorded.

10. A method for an image processing device, comprising:
a determination step of determining to apply a predetermined effect to a moving image in a case where an angle of view or an aspect ratio is changed in the moving image; and
an image processing step of applying the predetermined effect to the moving image according to the determination,
wherein when a sub moving image is composed with the moving image, in the case where an angle of view or an aspect ratio is changed in the moving image, the predetermined effect is not applied the moving image.

11. The method according to claim 10, wherein the determination step determines whether the angle of view is changed in the moving image recorded in a temporally continuous manner.

12. The method according to claim 10, wherein the determination step determines whether an image with an aspect ratio different from the aspect ratio of a moving image recorded in a temporally continuous manner is inserted into the moving image.

13. The method according to claim 10, wherein the image processing step applies the predetermined effect by compositing a frame to which the predetermined effect is to be applied with a frame preceding or following the frame in the moving image.

14. The method according to claim 10, wherein the image processing step applies the predetermined effect to a middle point in a chapter of the moving image, not a pause between chapters of the moving image.

15. A non-transitory computer-readable recording medium storing a program of instructions for causing a computer to perform a method comprising:

a determination step of determining to apply a predetermined effect to a moving image in a case where an angle of view or an aspect ratio is changed in the moving image; and an image processing step of applying the predetermined effect to the moving image according to the determination, wherein, when a sub moving image is composited with the moving image, in the case where an angle of view or an aspect ratio is changed in the moving image, the predetermined effect is not applied to the moving image.

16. The non-transitory computer-readable recording medium according to claim 15, wherein the determination step determines whether the angle of view is changed in the moving image recorded in a temporally continuous manner.

17. The non-transitory computer-readable recording medium according to claim 15, wherein the determination step determines whether an image with an aspect ratio different from the aspect ratio of the moving image recorded in a temporally continuous manner is inserted into the moving image.

18. The non-transitory computer-readable recording medium according to claim 15, wherein the image processing step applies the predetermined effect by compositing a frame to which the predetermined effect is to be applied with a frame preceding or following the frame in the moving image.

19. The non-transitory computer-readable recording medium according to claim 15, wherein the image processing step applies the predetermined effect to a middle point in a chapter of the moving image, not a pause between chapters of the moving image.

* * * * *